United States Patent
Shiota et al.

(10) Patent No.: US 8,897,736 B2
(45) Date of Patent: *Nov. 25, 2014

(54) MOBILE COMMUNICATION TERMINAL DEVICE

(71) Applicant: Renesas Electronics Corporation, Kawasaki (JP)

(72) Inventors: Shigemasa Shiota, Kanagawa (JP); Kunihiro Katayama, Kanagawa (JP); Shinichi Fukasawa, Kanagawa (JP); Takeo Kon, Kanagawa (JP); Seiji Kobayashi, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,216

(22) Filed: Jun. 19, 2013

(65) Prior Publication Data

US 2014/0011451 A1     Jan. 9, 2014

Related U.S. Application Data

(63) Continuation of application No. 12/838,467, filed on Jul. 18, 2010, now Pat. No. 8,478,224.

(30) Foreign Application Priority Data

Aug. 4, 2009   (JP) ................................ 2009-181288

(51) Int. Cl.
*H04B 1/06* (2006.01)
*H04B 5/00* (2006.01)
*G06K 7/00* (2006.01)
*G06K 7/10* (2006.01)

(52) U.S. Cl.
CPC ............ *H04B 5/0056* (2013.01); *G06K 7/0008* (2013.01); *G06K 7/10207* (2013.01)
USPC .......................... 455/343.1; 455/41.1; 455/574

(58) Field of Classification Search
USPC ................. 455/41.1, 41.2, 343.1, 343.5, 574, 455/552.1, 553.1; 340/10.1, 10.5, 10.51, 340/10.52
See application file for complete search history.

(56) References Cited

U.S. PATENT DOCUMENTS 7,240,846 B2 * 7/2007 Arisawa et al. ............... 235/492
7,296,742 B2   11/2007 Enomoto et al.
7,992,783 B2 * 8/2011 Sakai ............................ 235/439

FOREIGN PATENT DOCUMENTS

CN       101013903 A    8/2007
JP       2004-048251 A  2/2004

(Continued)

OTHER PUBLICATIONS

Office Action issued Mar. 28, 2013, in Japanese Patent Application No. 2009-181288.

(Continued)

*Primary Examiner* — Quochien B Vuong
(74) *Attorney, Agent, or Firm* — Miles & Stockbridge P.C.

(57) ABSTRACT

A mobile communication terminal device whose authentication and settlement functions by noncontact proximity communication can be continuously used even after operating voltage from battery power drops is provided. Only when the supply of required power from a battery is lost, a security controller is controlled into a mode in which it operates with low power consumption and noncontact authentication and settlement functions are ensured by external electromagnetic field power. Specifically, the following is implemented: when there is the supply of required power from the battery, it is made possible to carry out high-performance, multifunctional authentication and settlement processing making good use of high-speed processing, mass storage, and the like which are the advantages of the security controller essentially driven by battery; and in an anomalous instance in which the battery remaining capacity is lost, it is made possible to carry out minimal authentication and settlement processing.

16 Claims, 20 Drawing Sheets

(56) References Cited

FOREIGN PATENT DOCUMENTS

| | | | |
|---|---|---|---|
| JP | 2006-012002 | A | 1/2006 |
| JP | 2006-013603 | A | 1/2006 |
| JP | 2006-60700 | A | 3/2006 |

OTHER PUBLICATIONS

Office Action issued Jan. 30, 2014, in Chinese Patent Application No. 201010232326.9.

* cited by examiner

FIG. 12

| ADDRESS | STORED DATA |
|---------|-------------|
| 0 | |
| ⋮ | PGM_F |
| X | |
| ⋮ | ⋮ |
| Y | |
| ⋮ | PGM_S |
| Z | |
| ⋮ | ⋮ |

FIG. 13

| ADDRESS | STORED DATA |
|---|---|
| 0 | A(PGMSA_F) |
| 1 | C(PGMSA_S) |
| ⋮ | ⋮ |
| A | PGM_F |
| ⋮ | |
| B | |
| ⋮ | ⋮ |
| C | PGM_S |
| ⋮ | |
| D | |
| ⋮ | ⋮ |

MOBILE COMMUNICATION TERMINAL DEVICE

CROSS-REFERENCE TO RELATED APPLICATIONS

The disclosure of Japanese Patent Application No. 2009-181288 filed on Aug. 4, 2009 including the specification, drawings and abstract is incorporated herein by reference in its entirety.

BACKGROUND OF THE INVENTION

The present invention relates to a mobile communication terminal device that supports both noncontact proximity communication and wireless communication longer in communication distance than noncontact proximity communication and includes a security controller utilized in security processing in these types of communication and to a technology effectively applicable to, for example, a cellular phone having authentication and settlement functions.

A mobile terminal device having a noncontact proximity communication function refers to a device originally intended to be mainly used for any other purpose (cellular phone mainly intended for a telephone call function or the like) with noncontact authentication and settlement functions added thereto. Single-function card terminal devices dedicated to noncontact authentication and settlement functions basically do not use a battery. They receive a carrier wave (carrier) generated by an oppositely placed reader/writer and operates using its electromagnetic field power. When a mobile terminal device is additionally provided with its noncontact authentication and settlement functions, it consumes more power than card terminal devices. As a result, it cannot carry out its functions by supply of power by electromagnetic field transfer and must eventually use a battery. The reason for this is as follows: unlike card terminal devices, mobile terminal devices are made multifunctional so that a security controller carrying out security processing for noncontact authentication and settlement can be used also in mobile communication processing; and for this purpose, the performance of the CPU of the security controller and further the capacity of a storage device are increased and this increases power consumption.

The mobile terminal device functions on power supplied from a battery. Because of use for the principal purpose of the device, however, the power from the battery is consumed and it may get itself cornered in a situation in which it cannot carry out its functions for the principal purpose. In the mobile terminal device, power supply capability is estimated by monitoring the value of the output voltage of the battery. When the estimated value becomes equal to or lower than a certain voltage value, it is determined that the device has been brought into an unusable state and the functions for the principal purpose are stopped. However, the noncontact authentication and settlement functions do not consume so much power as the principal purpose. Therefore, even in such a state of power supply capability that the functions for the principal purpose cannot be carried out, there are the following cases: cases where the noncontact authentication and settlement functions can be carried out until the value is reduced to the next predetermined voltage value.

However, the noncontact authentication and settlement functions equipped in a mobile terminal device consume more power than those of single-function card terminal devices dedicated to noncontact authentication and settlement functions. Even though it seems to be operable according to the state of its battery self-discharging, the period for which it is operable is very short. There is not a high possibility that its noncontact authentication and settlement functions can be used during a period for which these functions can be carried out after the stop of the functions for the principal purpose. As a result, there is a high possibility that noncontact authentication or settlement cannot be carried out, either unless the supplying capability of the battery is restored. A mobile terminal device containing electronic information for the user's commuter pass will be taken as an example. If its noncontact authentication functions cannot be used because of battery remaining capacity shortage, the terminal device cannot operate as a commuter pass. In this case, the user must pay a fare in cash though he/she carries the pass unless the battery is recharged to bring the terminal device into a usable state.

Patent Document 1 describes a technology for reducing the power consumption of a cellular phone provided with, in addition to a telephone function, a noncontact IC card function part for carrying out a noncontact authentication function and a settlement function. According to this, to lengthen the life of a battery, battery power is supplied to the noncontact IC card function part when electromagnetic field power becomes short.

[Patent Document 1] Japanese Unexamined Patent Publication No. 2006-60700

SUMMARY OF THE INVENTION

However, even though in an attempt to lengthen the life of a battery, battery power is supplied to a noncontact IC card function part when electromagnetic field power is short, the following takes place. In the first place, the power consumption of the noncontact IC card function part is higher than that of card terminal devices dedicated to noncontact authentication and settlement functions. In this situation, it is expected that only with electromagnetic field power, power shortage occurs in almost all cases and the life of a battery cannot be lengthened as intended in many cases.

It is an object of the invention is to provide a mobile communication terminal device whose authentication and settlement functions by noncontact proximity communication (proximity noncontact communication) can be uninterruptedly used even when operating voltage from battery power drops.

The above and other objects and novel features of the invention will be apparent from the description in this specification and the accompanying drawings.

The following is a brief description of the gist of the representative elements of the invention laid open in this application:

Only when required power supply from a battery is lost, a security controller is controlled into a mode in which it operates with low power consumption and noncontact authentication and settlement functions are ensured by external electromagnetic field power. Thus, even when the battery remaining capacity is lost by use of the communication function for the principal purpose, noncontact authentication and settlement functions can be used. More specific description will be given. When there is supply of required power from a battery, high-performance, multifunctional authentication and settlement processing can be carried out by making good use of high-speed processing, mass storage, and the like which are advantages of security controllers fundamentally driven by a battery. In an anomalous instance in which the battery remaining capacity is lost, it is made possible to carry out minimal authentication and settlement processing.

The following is a brief description of the gist of effects obtained by the representative elements of the invention laid open in this application:

A mobile communication terminal device supports both noncontact proximity communication and wireless communication longer in communication distance than noncontact proximity communication and includes a security controller that can be utilized in security processing in these types of communication. In this terminal device, authentication and settlement functions by noncontact proximity communication can be uninterruptedly stably used even when operating voltage from battery power drops.

BRIEF DESCRIPTION OF THE DRAWINGS

FIG. 12 is a memory map diagram illustrating an example in which a first program PGM_F and a second program PGM_S are mapped to fixed memory areas;

FIG. 13 is a memory map diagram illustrating an example in which a first program PGM_F and a second program PGM_S can be mapped to arbitrary memory areas;

FIG. 14 is a flowchart illustrating an example of operation that takes place when the power to a security controller is turned on;

FIG. 18 is a flowchart illustrating an example of operation that takes place when the power to the security controller in FIG. 16 is turned on;

FIG. 22 is a flowchart illustrating an example of operation that takes place when the power to the security controller in FIG. 20 is turned on;

DETAILED DESCRIPTION OF THE PREFERRED EMBODIMENTS

1. Overview of Embodiments

Figure 1:
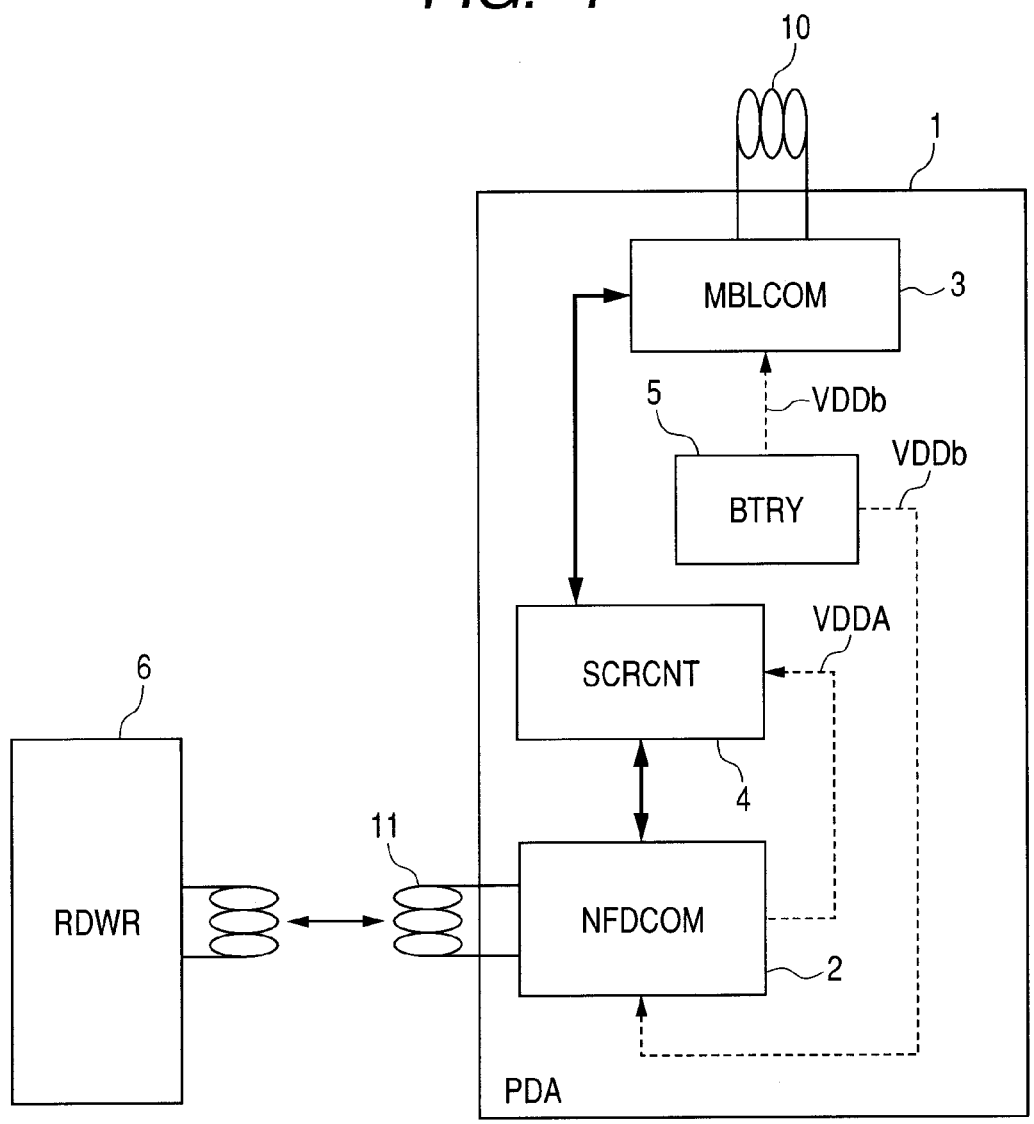
FIG. 1 is a block diagram illustrating an example of a mobile communication terminal device of the invention.

First, description will be given to the overview of embodiments representative of the invention disclosed in this specification. The parenthesized reference numerals in the drawings referred to in the description of the overview of the representative embodiments just indicate examples of what is contained in the concepts of constituent elements to which the numerals are affixed.

<1> A mobile communication terminal device (1) in a representative embodiment of the invention includes: a noncontact proximity communication unit (2) that carries out noncontact proximity communication; a wireless communication unit (3) that carries out wireless communication longer in communication distance than the noncontact proximity communication and carries out input/output control for this wireless communication; a security controller (4) utilized in security processing for the noncontact proximity communication unit and the wireless communication unit; and a battery (5). The noncontact proximity communication unit receives electromagnetic field power from a carrier in noncontact proximity communication and battery power from the battery and operates and supplies the received power to the security controller. The security controller determines whether or not voltage of power (VDDA) supplied from the noncontact proximity communication unit has reached a specified level (Vref). When it is determined that the voltage has not reached the specified level, control is carried out to reduce the electricity consumption of the security controller.

As a result, only when supply of required power from the battery is lost, the security controller is operated with low power consumption and noncontact authentication and settlement functions are ensured by external electromagnetic field power. Therefore, even when the battery remaining capacity is reduced by operation of the wireless communication unit, it is possible to uninterruptedly and stably use noncontact authentication and settlement functions using the security controller through the noncontact proximity communication unit.

<2> In the mobile communication terminal device in Section <1> above, the security controller includes a clock control circuit (25) that generates a synchronous clock signal for internal operation. When it is determined that the specified level has not been reached, the clock control circuit reduces the frequency of the synchronous clock signal (CK in FIGS. 7 and 8) as compared with when the specified level has been reached. By reducing the clock signal frequency, it is made possible to reduce the electricity consumption of the entire security controller and make good use of only minimal authentication and settlement processing by noncontact proximity communication (proximity noncontact communication).

<3> In the mobile communication terminal device in Section <1> above, the security controller includes a clock control circuit (25) that generates a synchronous clock signal for internal operation. When it is determined that the specified level has not been reached, the clock control circuit interrupts the supply of a synchronous clock signal (CK1 in FIG. 9) to a circuit utilized only in security processing for the wireless communication unit. Thus the supply of a synchronous clock signal to a circuit utilized only in security processing for the wireless communication unit that has already been inoperable because of reduced battery remaining capacity is interrupted. As a result, it is possible to make good use of only minimal authentication and settlement processing by proximity noncontact communication.

<4> In the mobile communication terminal device in any of Sections <1> to <3> above, the security controller carries out the following processing when it is determined that the specified level has not been reached: it interrupts operating power supply (Vdd2 in FIG. 5) to a circuit utilized only in security processing for the wireless communication unit. Thus operating power supply to a circuit utilized only in security processing for the wireless communication unit that has already been inoperable because of reduced battery remaining capacity is interrupted. As a result, it is possible to make good use of only minimal authentication and settlement processing by proximity noncontact communication.

<5> In the mobile communication terminal device in Section <4> above, the security controller includes: a program memory unit (20); a processor (21) that executes a program held by the program memory unit; a first circuit (22) used in security processing for the wireless communication unit; and a second circuit (23) used in security processing for the noncontact proximity communication unit. The program memory unit holds: a first initialization program (MIPGM) for initializing a circuit used in security processing for the wireless communication unit; a second initialization program (NIPGM) for initializing a circuit used in security processing for the noncontact proximity communication unit; a first security processing program (MSPGM, RTOS) used in security processing for the wireless communication unit; and a second security processing program (NSPGM) used in security processing for the noncontact proximity communication unit.

<6> In the mobile communication terminal device in Section <5> above, the program memory unit includes: a first program memory unit (41) for storing the first initialization program and the first security processing program; and a second program memory unit (40) for storing the second initialization program and the second security processing program. There are two selectable operation modes. In first operation mode, operating power supply is supplied both to the first program memory unit and to the second program memory unit. In second operation mode, operating power supply is supplied only to the second program memory unit. When operating power supply to a circuit utilized only in security processing for the wireless communication unit is interrupted, the second operation mode is selected. As the result of the program memory unit being divided as mentioned above, the electricity consumption can be further reduced when the security controller is operated by electromagnetic field power only.

<7> In the mobile communication terminal device in Section <6> above, the processor carries out the following processing on a case-by-case basis: when it is determined that the voltage has reached the specified level at power-on reset, it executes the first initialization program and the second initialization program to carry out initialization processing; and when it is determined that the voltage has not reached the specified level, it executes the second initialization program to carry out initialization processing. When the security controller is operated by electromagnetic field power only, wasteful electricity consumption by initialization of an unnecessary circuit that is not used can be reduced.

Figure 2:
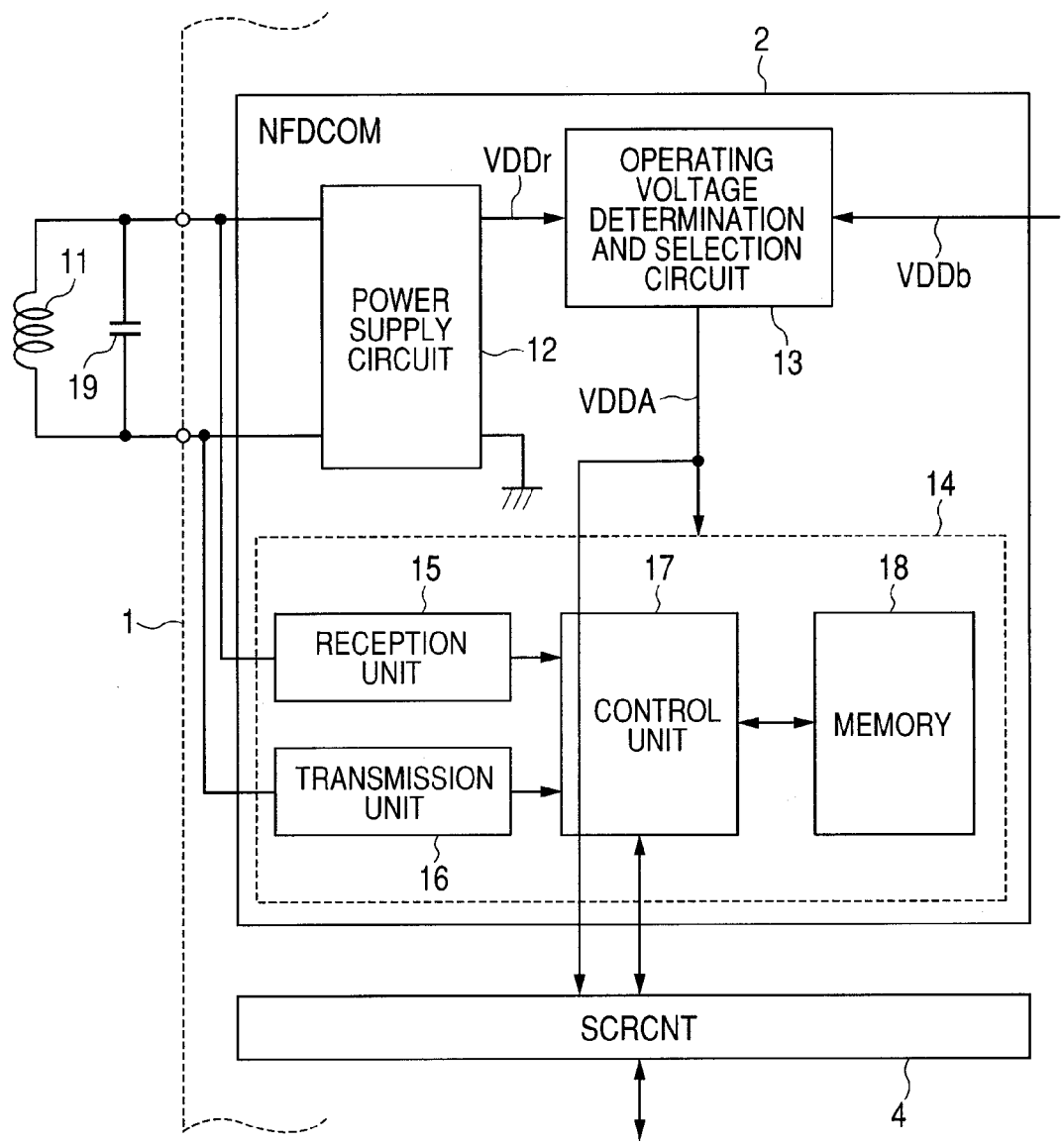
FIG. 2 is a block diagram illustrating a concrete example of a noncontact proximity communication unit 2.

<8> In the mobile communication terminal device in any of Sections <1> to <7> above, the noncontact proximity communication unit carries out the following processing on a case-by-case basis: in cases where voltage from the battery power is higher than a predetermined voltage, it supplies the electromagnetic field power to the security controller when it is produced, and supplies battery power thereto when it is not produced; and in cases where voltage from the battery power is equal to or lower than the predetermined voltage, it supplies the electromagnetic field power to the security controller and interrupts supply of the battery power (13 in FIG. 2).

When the noncontact proximity communication unit carries out communication operation, electromagnetic field power is constantly supplied to the security controller. When the security controller determines that voltage from electromagnetic field power is voltage lower than the specified voltage and noncontact proximity communication is carried out, the security controller can be operated with reduced power consumption regardless of voltage from battery power supply. When the noncontact proximity communication unit carries out communication operation, it is based on the presupposition that the wireless communication unit will not carry out communication.

<9> In the mobile communication terminal device in any of Sections <1> to <7> above, the noncontact proximity communication unit carries out the following processing on a case-by-case basis: when voltage from the battery power is higher than the predetermined voltage, it supplies at least battery power to the security controller; and when voltage from the battery power is equal to or lower than the predetermined voltage, it supplies the electromagnetic field power to the security controller and interrupts supply of the battery power.

<10> In the mobile communication terminal device in Section <8> or <9> above, the specified voltage and the predetermined voltage are equal to each other.

<11> A mobile communication terminal device in another embodiment of the invention includes: a noncontact proximity communication unit that carries out noncontact proximity communication; a wireless communication unit that carries out wireless communication longer in communication distance than the noncontact proximity communication and carries out input/output control for this wireless communication; a security controller utilized in security processing for the noncontact proximity communication unit and the wireless communication unit; and a battery. The noncontact proximity communication unit receives electromagnetic field power from a carrier in noncontact proximity communication and battery power from the battery and determines whether or not voltage from the received battery power has reached a specified level (30B in FIG. 20). The security controller receives the result of the determination and when it is determined that the voltage has not reached the specified level, it carries out control so as to reduce the electricity consumption of the security controller. This makes unnecessary to provide the determination function aside from the security controller. When the noncontact proximity communication unit selectively supplies electromagnetic field power or battery power to the security controller in the mobile communication terminal device in Section <1> above, it is required to take the following measure: the determination function is provided not only in the security controller but also in the noncontact proximity communication unit.

<12> A mobile communication terminal device in further another embodiment of the invention includes: a noncontact proximity communication unit that carries out noncontact proximity communication; a wireless communication unit that carries out wireless communication longer in communication distance than the noncontact proximity communication and carries out input/output control for this wireless communication; a security controller utilized in security processing for the noncontact proximity communication unit and the wireless communication unit; and a battery. The noncontact proximity communication unit receives electromagnetic field power from a carrier in noncontact proximity communication and battery power from the battery and determines whether or not voltage from the received battery power has reached a specified level. When it is determined that the specified level has not been reached, it issues a command (NCMD) instructing the security controller to carry out control so as to reduce electricity consumption (30B in FIG. 23). The wireless communication unit receives battery power from the battery and determines whether or not voltage from the received battery power has reached a specified level. When the specified level has not been reached, it issues a command (MCMD) instructing the security controller to carry out control so as to reduce electricity consumption (30C in FIG. 23)

2. Details of Embodiments

More detailed description will be given to the embodiments.

FIG. 1 illustrates an example of a mobile communication terminal device of the invention. The mobile communication terminal device (PDA) 1 shown in the drawing is formed by adding an IC card function including a noncontact proximity communication function to a cellular phone that carries out so-called mobile communication. Specifically, the mobile communication terminal device 1 includes: a noncontact proximity communication unit (NFDCOM) 2 that carries out noncontact proximity communication; a mobile communication unit (MBLCOM) 3 as a wireless communication unit that carries out wireless communication (for example, mobile communication with a cellular phone or the like) longer in communication distance than the noncontact proximity communication and carries out input/output control for this wireless communication; a security controller (SCRCNT) 4 utilized in security processing for the noncontact proximity communication unit 2 and the mobile communication unit 3; and a battery (BTRY) 5.

Though not especially shown in the drawing, the mobile communication unit 3 includes: a high-frequency unit coupled to an antenna 10; a base band unit that carries out protocol processing, such as modulation of transmit data and demodulation of received signals; an application processor unit that carries out data processing, such as generation of transmit data and display control on received data; a liquid crystal display, a keyboard, and the like. Provided with these members, the mobile communication unit 3 carries out the functions of a cellular phone and is operated using battery voltage VDDb from the battery 5 as operating power supply.

The noncontact proximity communication unit 2 transmits and receives data to and from an oppositely placed reader/writer (RDWR) 6 in close-range wireless communication. Further, it receives electromagnetic field power from a carrier from the reader/writer 6 and battery power from the battery and supplies the received power to the security controller 4.

Preliminary description will be given to a concrete example of the noncontact proximity communication unit 2 with reference to FIG. 2. An antenna 11 and a capacitor 19 coupled in parallel therewith form a resonance circuit. A power supply circuit 12 is comprised of a rectifying circuit and a smoothing capacitor, neither of which is shown in the drawing. It rectifies and smoothes a carrier (alternating-current signal) as an electromagnetic wave power in noncontact communication received at the antenna 11 to generate received voltage VDDr. An operating voltage determination and selection circuit 13 is inputted with the received voltage VDDr and battery voltage VDDb from the battery 5: When the battery voltage VDDb is higher than a predetermined voltage, for example, a voltage expected as received voltage VDDr (expected received voltage), the operating voltage determination and selection circuit 13 carries out the following processing on a case-by-case basis: in cases where the electromagnetic field power has been produced, it outputs received voltage VDDr from this electromagnetic field power as operating voltage VDDA; and in cases where the electromagnetic field power has not been produced, it outputs the battery voltage VDDb as operating voltage VDDA. When the battery voltage VDDb is equal to or lower than the predetermined voltage, the operating voltage determination and selection circuit 13 outputs the received voltage VDDr as operating voltage VDDA. The operating voltage VDDA is used as operating power supply to an internal circuit 14 and the security controller 4. When the inputted operating voltage VDDA is higher than the upper limit of operation enable voltage, the internal circuit 14 steps down the operating voltage VDDA to generate expected received voltage expected as the received voltage VDDr and uses it as internal operating voltage.

The internal circuit 14 is comprised of a reception unit 15, a transmission unit 16, a control unit 17, and a memory 18. The reception unit 14 demodulates data superimposed on an alternating-current signal received by the antenna 11 and supplies it as digital received data to the control unit 17. The transmission unit 16 modulates an alternating-current signal as a carrier received by the antenna 11 based on digital transmit data supplied from the control unit 17. The memory temporarily holds transmit and received data.

Figure 3:
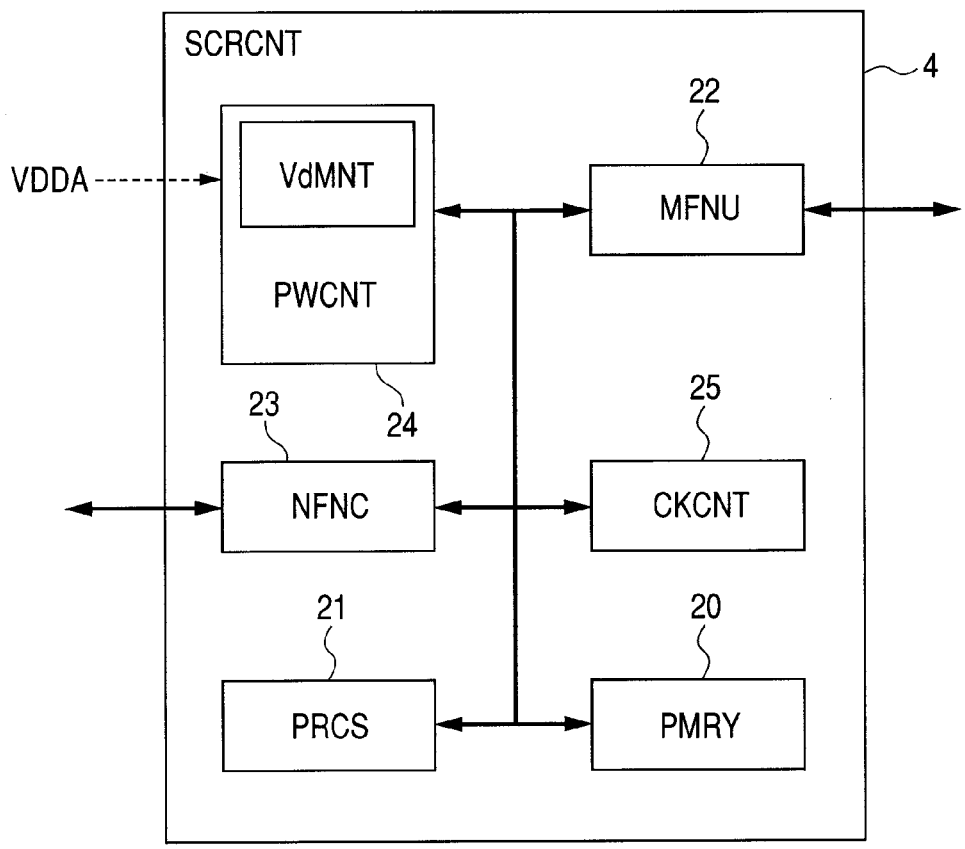
FIG. 3 is a block diagram illustrating an example of a security controller.

As illustrated in FIG. 3 as an example, the security controller 4 includes: a program memory unit (PMRY) 20; a processor (PRSC) 21 that carries out a program held by the program memory unit 20; an mobile communication unit interface circuit (MFNC) 22 used for interface with the mobile communication unit 3; a noncontact proximity communication unit interface circuit (NFNC) 23 used for interface with the noncontact proximity communication unit 2; a power supply control unit (PWCNT) 24 that controls power supply to the security controller 4; and a clock control unit (CKCNT) 25 that controls the clock of the security controller 4. These members are coupled to an internal bus 26. The mobile communication unit interface circuit 22 is coupled to the mobile communication unit 3 and the noncontact proximity communication unit interface circuit 23 is coupled to the noncontact proximity communication unit 2.

Figure 4:
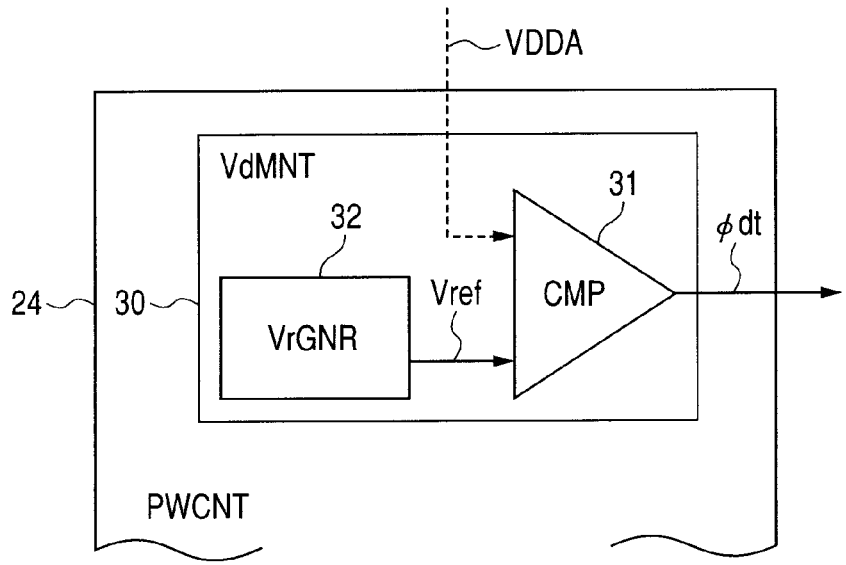
FIG. 4 is a block diagram illustrating an example of a voltage monitoring circuit.

The power supply control unit 24 includes a voltage monitoring circuit (VdMNT) 30. As illustrated in FIG. 4 as an example, the voltage monitoring circuit 30 determines whether or not the operating voltage VDDA supplied from the noncontact proximity communication unit 2 is higher than a specified level Vref through a comparator (CMP) 31 and outputs a determination signal φdt. The specified level Vref is generated at a reference voltage generation circuit (VrGNR)

32. Though not especially limited, the specified level Vref is defined as a voltage at the lowest level required for the security controller 4 to use all its functions to operate, that is, all functionality operation guaranteed voltage. This all functionality operation guaranteed voltage is, for example, a voltage identical with or slightly higher than the predetermined voltage determined by the operating voltage determination and selection circuit 13 of the noncontact proximity communication unit 2.

The security controller 4 carries out low-power consumption control based on the determination signal 4dt generated at the voltage monitoring circuit 30. Hereafter, detailed description will be given to this control mode with low power consumption with multiple examples cited.

<<Control of Supply/Interruption of Operating Voltage>>

A first control mode with low power consumption is a method in which the supply/interruption of operating voltage is controlled.

Figure 5:
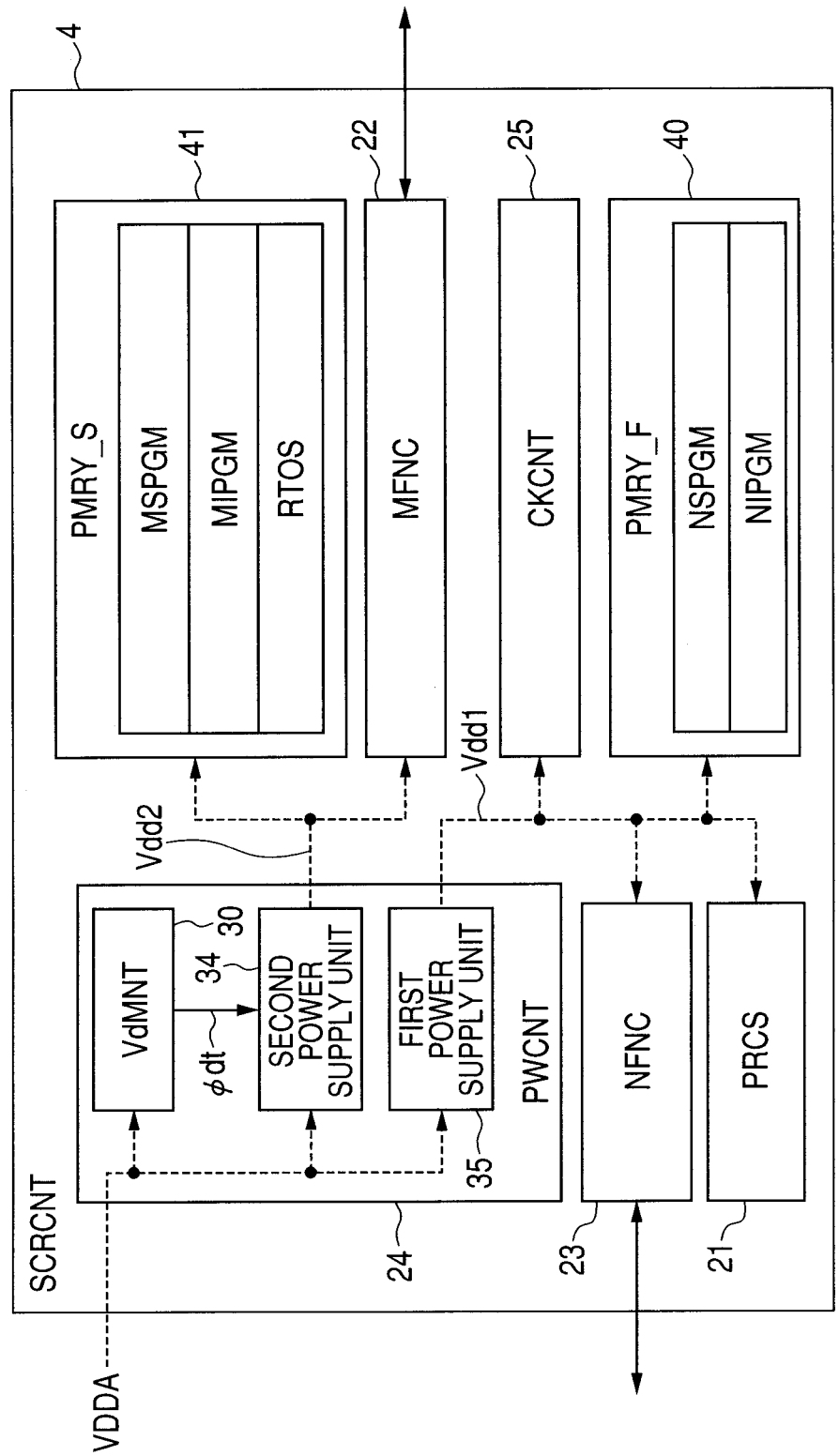
FIG. 5 is a block diagram illustrating an example of a mode of supplying operating voltage to an internal circuit by a power supply control unit.

As illustrated in FIG. 5 as an example, the power supply control unit 30 includes: a second power supply unit 34 that supplies operating voltage Vdd2 to a circuit portion utilized only in security processing for the mobile communication unit 3 in the security controller 4; and a first power supply unit 35 that supplies operating power supply Vdd1 to the other circuit portions. The second power supply unit 34 interrupts the supply of second operating voltage Vdd2 when the determination signal φdt indicates that the specified level Vref has not been exceeded; and the first power supply unit 35 constantly supplies first operating voltage Vdd1.

In FIG. 5, the program memory unit 20 is divided into a first program memory unit (20_F) 40 and a second program memory unit (20_S) 41, which individually receive operating power supply so that memory operation is enabled. Though not especially limited, the second program memory unit 41 stores a security processing program (MSPGM) for mobile communication, a security processing initialization program (MIPGM) for mobile communication, and a real-time OS (RTOS). Though not especially limited, the first program memory unit 40 stores a security processing program (NSPGM) for noncontact proximity communication and a security processing initialization program (NIPGM) for noncontact proximity communication.

According to the example in FIG. 5, the operating voltage Vdd2 outputted by the second power supply unit 34 is supplied to the second program memory unit 41 and the mobile communication unit interface circuit (MFNC) 22. The operating voltage Vdd1 outputted by the first power supply unit 35 is supplied to the first program memory unit 40, processor 21, clock control unit 25, and noncontact proximity communication unit interface circuit (MFNC) 23.

As the result of the foregoing, the following processing is carried out when it is determined that the operating voltage VDDA is not higher than the specified level Vref: the supply of operating voltage Vdd2 to the circuits 22, 41 utilized only in security processing for the mobile communication is interrupted. Thus the supply of operating voltage Vdd2 to the circuits utilized only in security processing for mobile communication that have already been inoperable because of reduced battery remaining capacity is interrupted. As a result, it is possible to make good use of only minimal authentication and settlement processing by proximity noncontact communication. Especially, the operating voltage determination and selection circuit 13 of the noncontact proximity communication unit 2 carries out the following processing when the received voltage VDDr is generated at the power supply circuit 12. That is, it carries out the following processing when noncontact proximity communication is carried out: even though the battery voltage VDDb is not equal to or lower than the specified level, it supplies the security controller 4 with the received voltage VDDr as operating voltage VDDA. Therefore, when noncontact proximity communication is carried out, the security controller 4 can be operated with reduced power consumption regardless of the voltage of battery power supply. This is based on the presupposition that when the noncontact proximity communication unit carries out communication operation, the wireless communication unit does not carry out communication. In short, when the noncontact proximity communication unit 2 carries out noncontact proximity communication, the mobile communication unit 3 does not carry out mobile communication and the security controller 4 only has to be capable of security processing for noncontact proximity communication. The security controller is supplied with the received voltage VDDr as operating voltage VDDA and operating power supply to the mobile communication unit interface circuit 22 and the second program memory unit 41 that are unnecessary for noncontact authentication and settlement is interrupted.

<<Clock Frequency Control>>

A second control mode with low power consumption is a method in which a clock frequency is controlled.

Figure 6:
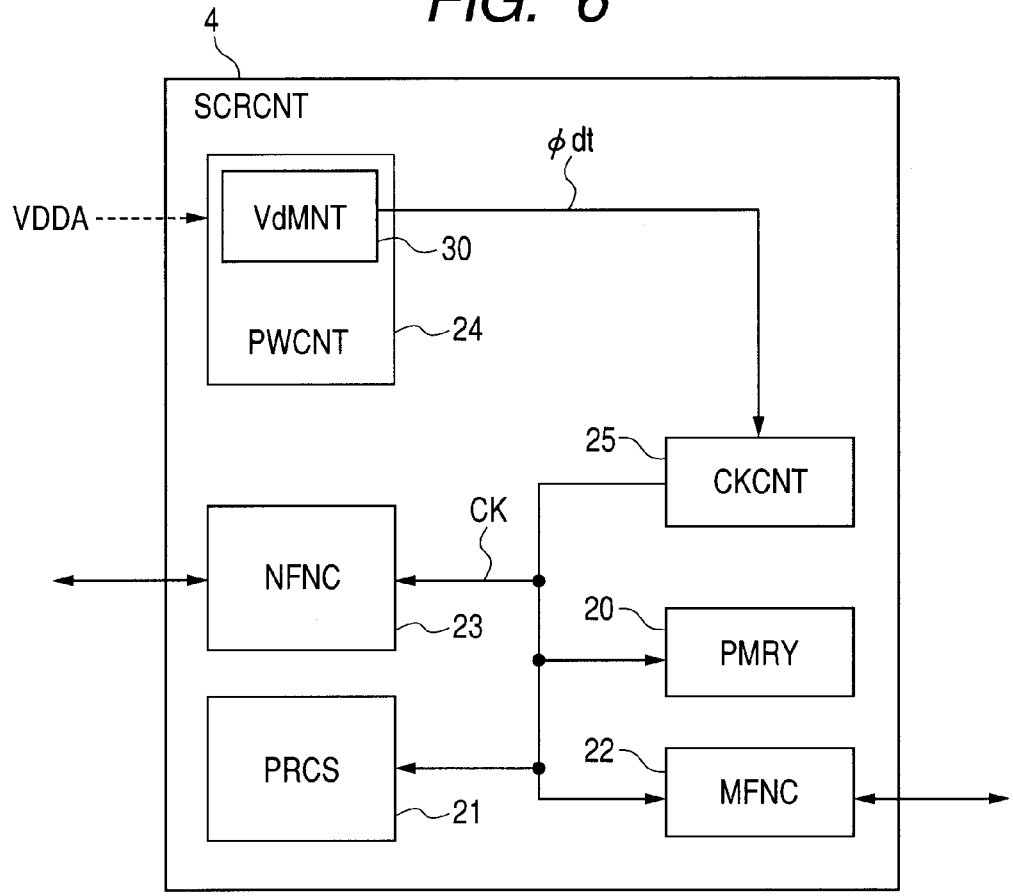
FIG. 6 is a block diagram illustrating an example of the clock supply system of a security controller.

FIG. 6 illustrates an example of the clock supply system of the security controller 4. The clock control unit (clock control circuit) 25 receives the determination signal φdt and controls the frequency of a clock signal CK according to its value. Specifically, when it is determined that the operating voltage VDD2 it not higher than the specified level Vref, the following processing is carried out: the frequency of the clock signal CK is made lower than when it is determined that the operating voltage VDD2 it higher than the specified level Vref. By reducing the clock signal frequency, it is made possible to reduce the electricity consumption of the entire security controller and make good use of only minimal authentication and settlement processing by proximity noncontact communication.

Figure 7:
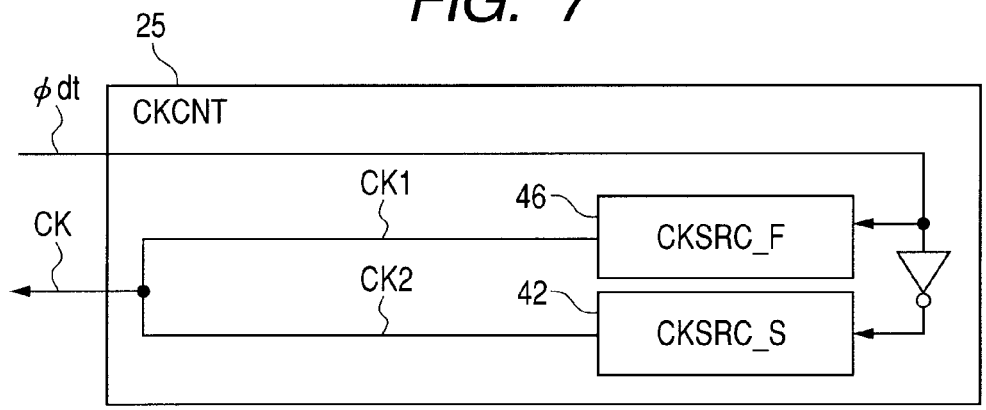
FIG. 7 is a block diagram illustrating an example of a clock control unit.

FIG. 7 illustrates an example of the clock control unit 25. In this example, the clock control unit 25 includes a first clock source (CKSRC_F) 46 that generates a clock signal CK1 and a second clock source (CKSRC_S) 42 that generates a clock signal CK2. It causes either clock source to perform oscillating operation according to the value of the determination signal φdt to generate a clock signal CK. The clock signal CK1 is higher in frequency than the clock signal CK2. When the determination signal φdt indicates that the operating voltage VDD2 is equal to or lower than the specified voltage Vref, the second clock source 42 is caused to perform oscillating operation to generate a clock signal CK. In the other cases, the first clock source 41 is caused to perform oscillating operation to generate a clock signal CK. The output of a clock source that is not performing oscillating operation is kept in high output impedance state. When the operation of the second clock source 42 is selected, the electricity consumption by the oscillating operation of the clock source is reduced.

Figure 8:
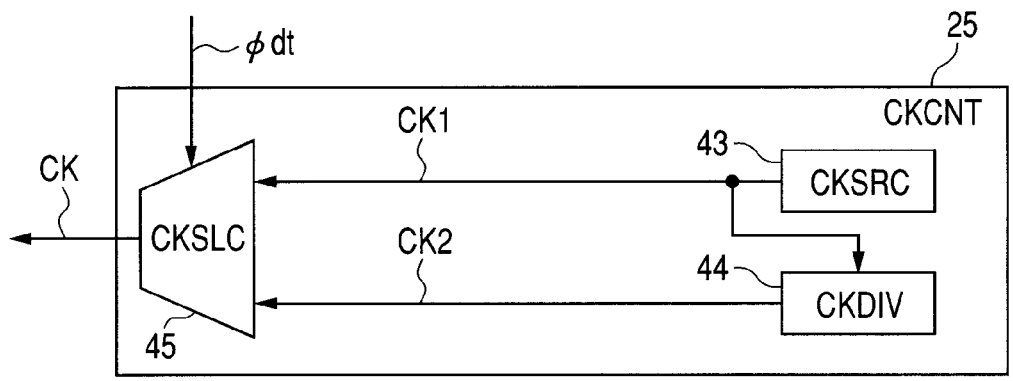
FIG. 8 is a block diagram illustrating another example of a clock control unit.

FIG. 8 illustrates another example of the clock control unit 25. In this example, the clock control unit 25 includes: a first clock source (CKSRC) 43 that generates a clock signal CK1; a frequency divider circuit (CKDIV) 44 that divides the frequency of the clock signal CK1 to generate a clock signal CK2; and a clock selector circuit (CKSLC) 45. Either clock signal CK1 or CK2 is selected according to the value of the determination signal φdt. When the determination signal φdt indicates that the operating voltage VDD2 is equal to or lower than the specified voltage Vref, the clock signal CK2 is selected and in the other cases, the clock signal CK1 is selected. Since clock sources can be unified, the chip occupation area of the clock control circuit 25 can be reduced, for example, when the security controller 4 is formed in one chip as a semiconductor integrated circuit or on other like occasions. The clock source need not be formed in the security controller 4 and the foregoing is the same with cases where a clock signal is supplied from an external oscillator or an external source.

The adoption of the above clock frequency control makes it possible for the security controller 4 to determine the remaining power of the battery 5 by monitoring the value of the supplied operating voltage VDD2. Power saving operation using the received voltage VDDr from electromagnetic field power can be carried out in either of the following cases: cases where mobile communication is not carried out and noncontact proximity communication is carried out even though there is power remaining in the battery; and cases where battery power supply is interrupted.

<<Control of Supply/Interruption of Clock Signal>>

A third control mode with low power consumption is a method in which supply/interruption of a clock signal is controlled.

Figure 9:
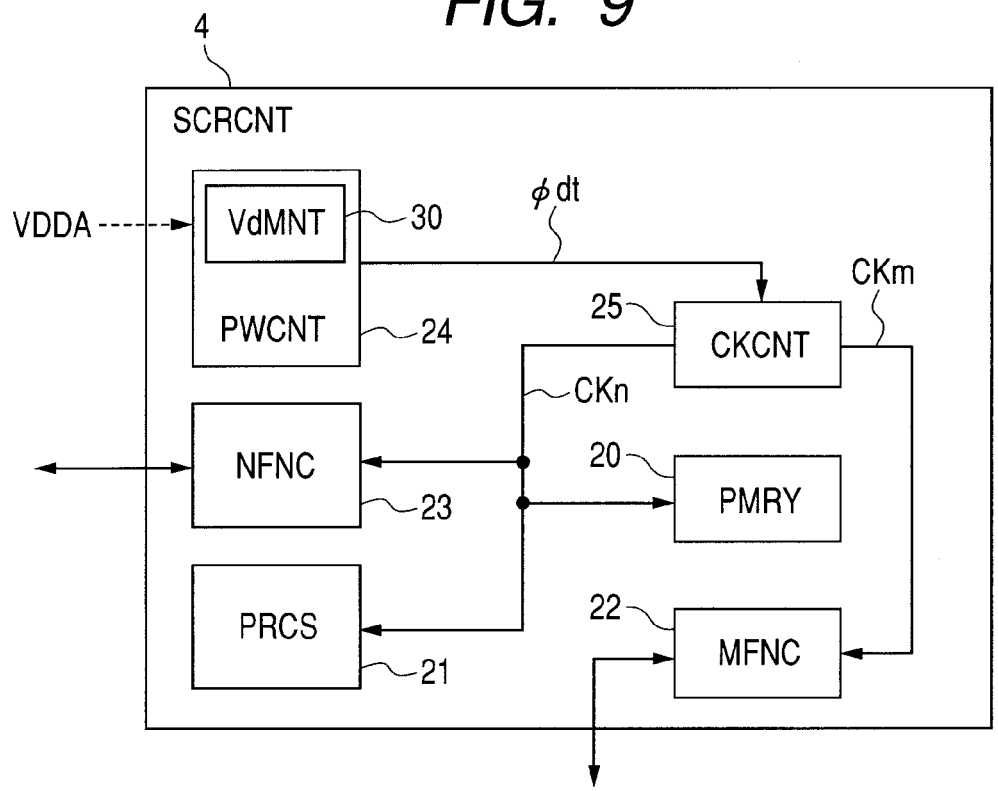
FIG. 9 is a block diagram illustrating another example of the clock supply system of a security controller.

FIG. 9 illustrates another example of the clock supply system of the security controller 4. The clock control circuit 25 supplies a clock signal CKm to the mobile communication unit interface circuit 22 used only in security processing for mobile communication and a clock signal CKn to the other circuit portions. Though not especially limited, the clock signals CKm and CKn are identical in frequency. In the example in FIG. 9, the clock control unit 25 operates on a case-by-case basis as follows: when the determination signal φdt indicates that the operating voltage VDDA is higher than the specified voltage Vref, it supplies both the clock signals CKm and CKn to the respective circuits; and when the determination signal φdt indicates that the operating voltage VDDA is lower than the specified voltage Vref, it interrupts the supply of clock signal CKm. The following can be implemented by selectively interrupting the supply of clock signal CKm: it is made possible to reduce the electricity consumption of the entire security controller and make good use of only minimal authentication and settlement processing by proximity noncontact communication.

Figure 10:
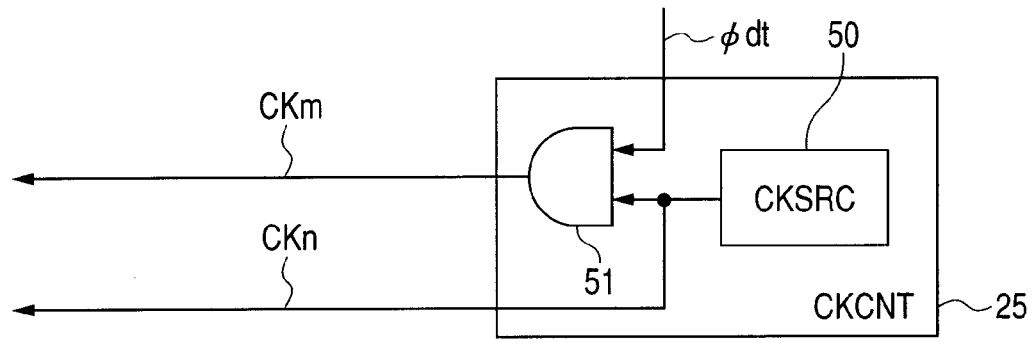
FIG. 10 is a block diagram illustrating an example of a control logic of a clock control circuit that implements the functions of the clock supply system in FIG. 9.

FIG. 10 illustrates an example of the control logic of the clock control circuit 25 for carrying out the function in FIG. 9. The clock control circuit 25 includes a clock source (CK-SRC) 50 that outputs a clock signal CKn. In response to a high level of the determination signal φdt, it outputs the clock signal CKn as clock signal CKm from a NAND gate 51.

<<Program Change>>

A fourth control mode with low power consumption is a method in which changing of programs executed by the processor 21 is controlled.

Figure 11:
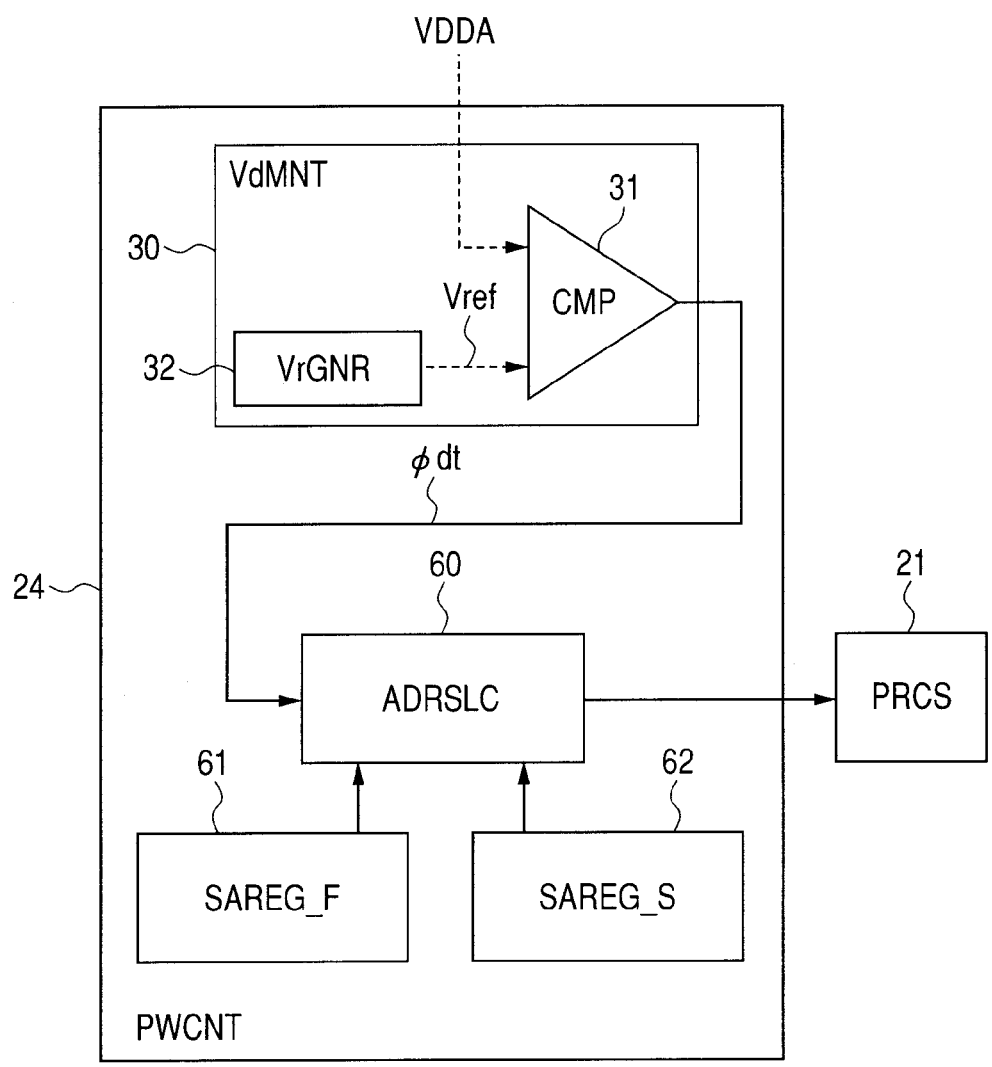
FIG. 11 is a block diagram illustrating an example of a configuration for making it possible to select a program start address using a power supply control circuit.
Figure 12:
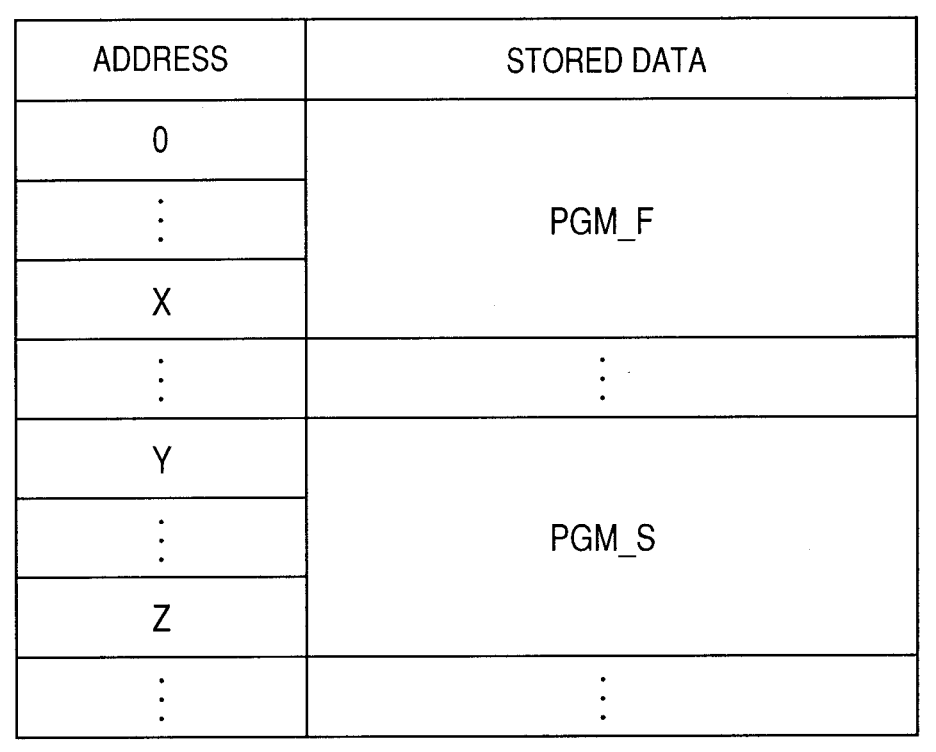

FIG. 11 illustrates an example of a configuration for making it possible to select a program start address using a power supply control circuit. A first start address register (SAREG_F) 61 holds the start address of a first program for making all the functions of the security controller 4 available under the control of the processor 21. A second start address register (SAREG_S) 62 holds the start address of a second program for carrying out security processing for noncontact proximity communication of the security controller 4 under the control of the processor 21. Though not especially limited, the program start address is swiftly read at power-on reset of the security controller 4 or at system reset and it is desirable that this address information should be held before and after a reset. Therefore, the first start address register 61 and the second start address register 62 may be a dedicated nonvolatile memory or part of a nonvolatile memory for making address information changeable. They may be fixedly held by ROM or the like. An address selector 60 initially sets the following on the program counter (PC), not shown, of the processor 21 on a case-by-case basis at power-on reset of the security controller 4 or at system reset as follows: when the determination signal φdt indicates that the operating voltage VDDA is lower than the specified voltage Vref, it sets the start address of the second start address register 62; and when the determination signal 4dt indicates that the operating voltage VDDA is higher than the specified voltage Vref, it sets the start address of the first start address register 61. Though not especially limited, the first program is comprised of the following programs stored from the start address of its program storage area in the following order: the security processing initialization program (MIPGM) for mobile communication; the security processing initialization program (NIPGM) for noncontact proximity communication, the real-time OS (RTOS); the security processing program (MSPGM) for mobile communication; and the security processing program (NSPGM) for noncontact proximity communication. The second program is comprised of the following programs stored from the start address of its program storage area in the following order: the security processing initialization program (NIPGM) for noncontact proximity communication; and the security processing program (NSPGM) for noncontact proximity communication. As illustrated in FIG. 12 as an example, the first program PGM_F and the second program PGM_S are stored in the program memory 20 completely separately from each other. The first program PGM_F is stored in the area whose initial address is address 0 and the second program PGM_S is stored in the area whose initial address is address Y. When it is enabled to rewrite the first start address register (SAREG_F) 61 and the second start address register (SAREG_S) 62 by mapping them into a memory space as illustrated in FIG. 13, the first program PGM_F and the second program PGM_S can be mapped into an arbitrary memory area.

Figure 14:
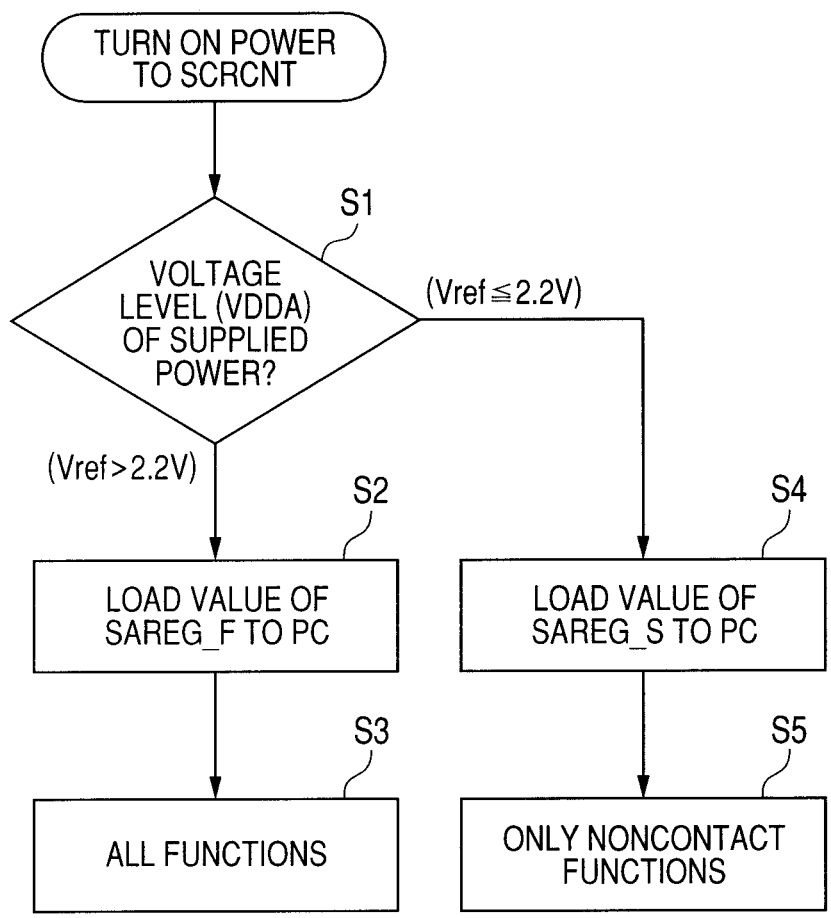

With the above configuration, the processing is carried out as illustrated in FIG. 14 as an example. That is, when the power to the security controller 4 is turned on, it is determined whether or not its operating voltage VDDA is higher than the specified voltage Vref (S1). When it is higher than, for example, the specified voltage Vref (=2.2V), the address of the first start address register (SAREG_F) 61 is loaded to the program counter (PC) of the processor 21 (S2). Then the execution of the first program is started at the loaded address and all the functions of the security controller 4 are made available (S3). When the operating voltage is equal to or lower than, for example, the specified voltage Vref (=2.2V), the address of the second start address register (SAREG_S) 62 is loaded to the program counter (PC) of the processor 21 (S4). Then the execution of the second program is started at the loaded address and in the security controller 4, only security processing for noncontact proximity communication available is made (S5). When the battery power drops, in the security controller 4, only initialization operation required for security processing for noncontact proximity communication is performed and initialization operation required for security processing for mobile communication is not performed. Therefore, it is possible to omit wasteful processing in processing using a little power from electromagnetic field power and guarantee swift transition to noncontact proximity communication. In the example in FIG. 14, voltage level is determined only when power supply is turned on. Instead, it may be monitored as required or may be constantly monitored and the state of the security controller may be modified according thereto.

Figure 15:
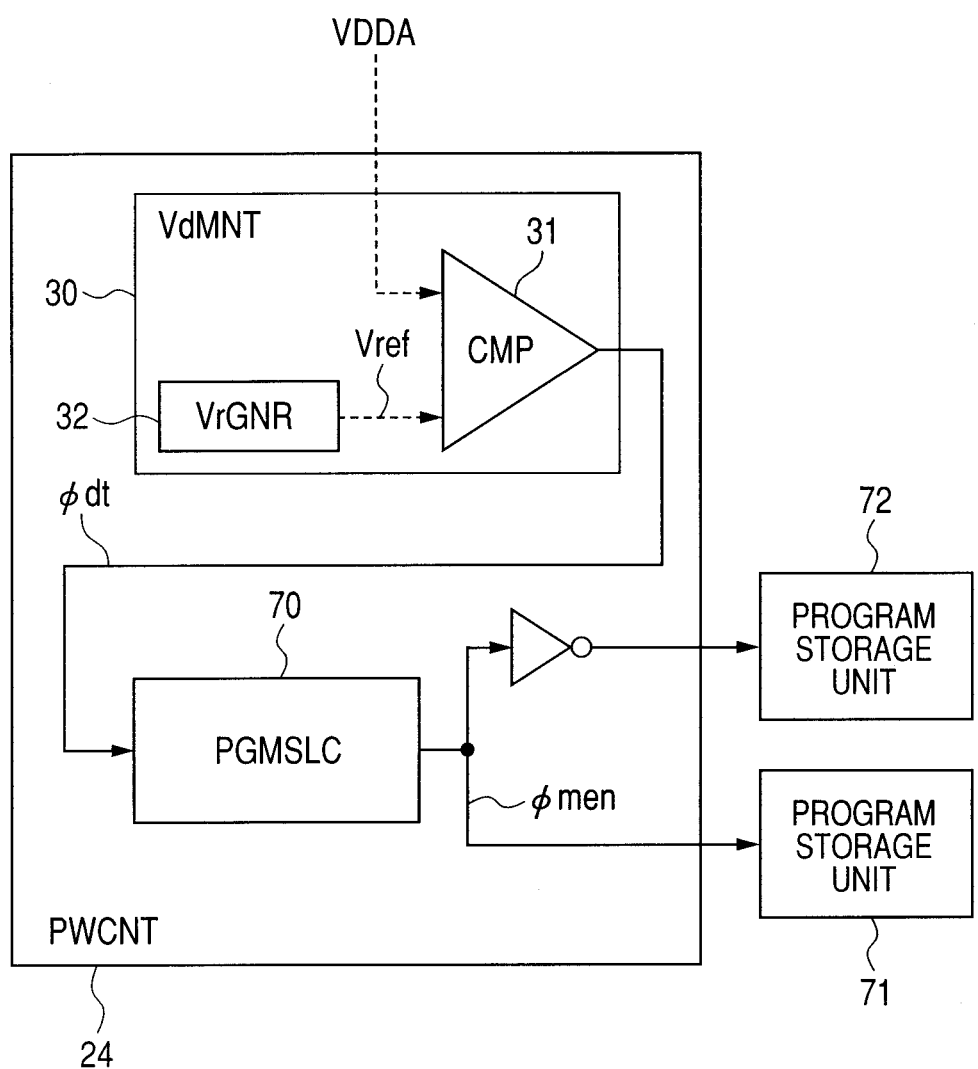
FIG. 15 is a block diagram illustrating an example in which program change control, executed through program area activation control, is carried out.

FIG. 15 illustrates an example in which changing of executed programs is controlled by program area activation control. A storage unit (storage area) 71 for the first program (PGM_F) holds the following programs from the start address of its storage area in the following order: the security processing initialization program (MIPGM) for mobile communication; the security processing initialization program (NIPGM) for noncontact proximity communication; the real-time OS (RTOS); the security processing program (MSPGM) for mobile communication; and the security processing program (NSPGM) for noncontact proximity communication. A storage unit (storage area) 72 for the second program (PGM_S) holds the following programs from the start address of its storage unit (storage area) in the following order: the security processing initialization program (NIPGM) for noncontact proximity communication; and the security processing program (NSPGM) for noncontact proximity communication. The program storage units (program storage area) 71, 72 may be separate memories or may be different memory blocks in an identical memory; however, they are at least selectively activated. A program selector (PGMSLC) 70 makes the following storage units (storage areas) active by an activation control signal ϕmen on a case-by-case basis at power-on reset of the security controller 4 or at system reset as follows: when the determination signal ϕdt indicates that the operating voltage VDDA is lower than the specified voltage Vref, it makes the second program storage unit (second program storage area) 72 active; and when the determination signal ϕdt indicates that the operating voltage VDDA is higher than the specified voltage Vref, it makes the first program storage unit (first program storage area) 71 active. One activated storage unit (storage area) is mapped to the memory space of the processor 21 and instructions are sequentially executed from that at the initial address of this storage unit (storage area). Also with the configuration in FIG. 15, in the security controller 4, only initialization operation required for security processing for noncontact proximity communication is carried out when the battery power drops. Initialization operation required for security processing for mobile communication is not carried out. Therefore, it is possible to omit wasteful processing in processing using a little power from electromagnetic field power and guarantee swift transition to noncontact proximity communication.

<<Determination of Battery Voltage by Security Controller>>

In the above-described controls with low power consumption, the security controller 4 determines the level of operating voltage VDDA. Description will be given to a fifth control mode with low power consumption in which the battery voltage VDDb is determined by the security controller 4.

Figure 16:
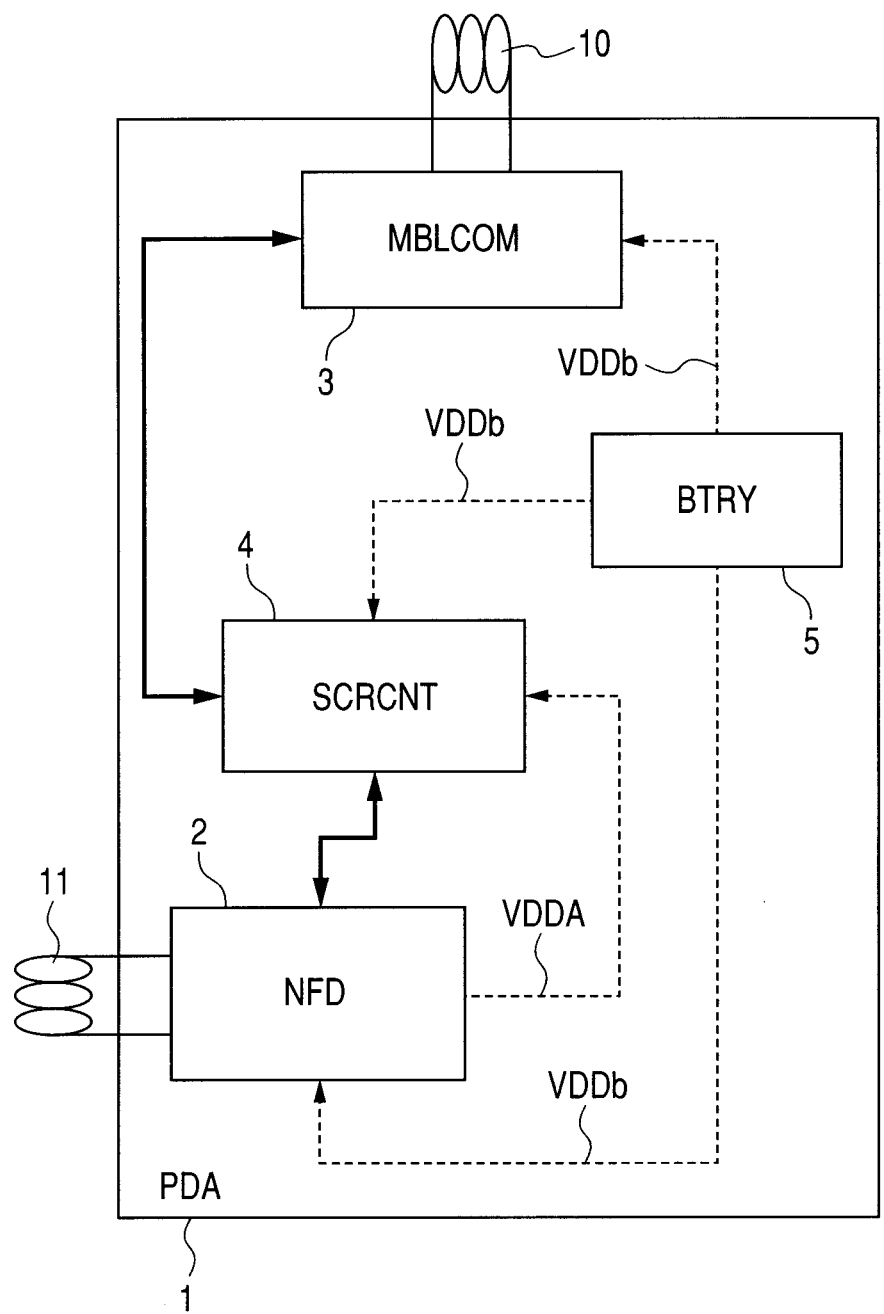
FIG. 16 is a block diagram illustrating an example of a mobile communication terminal device in which a security controller determines battery voltage VDDb.
Figure 17:
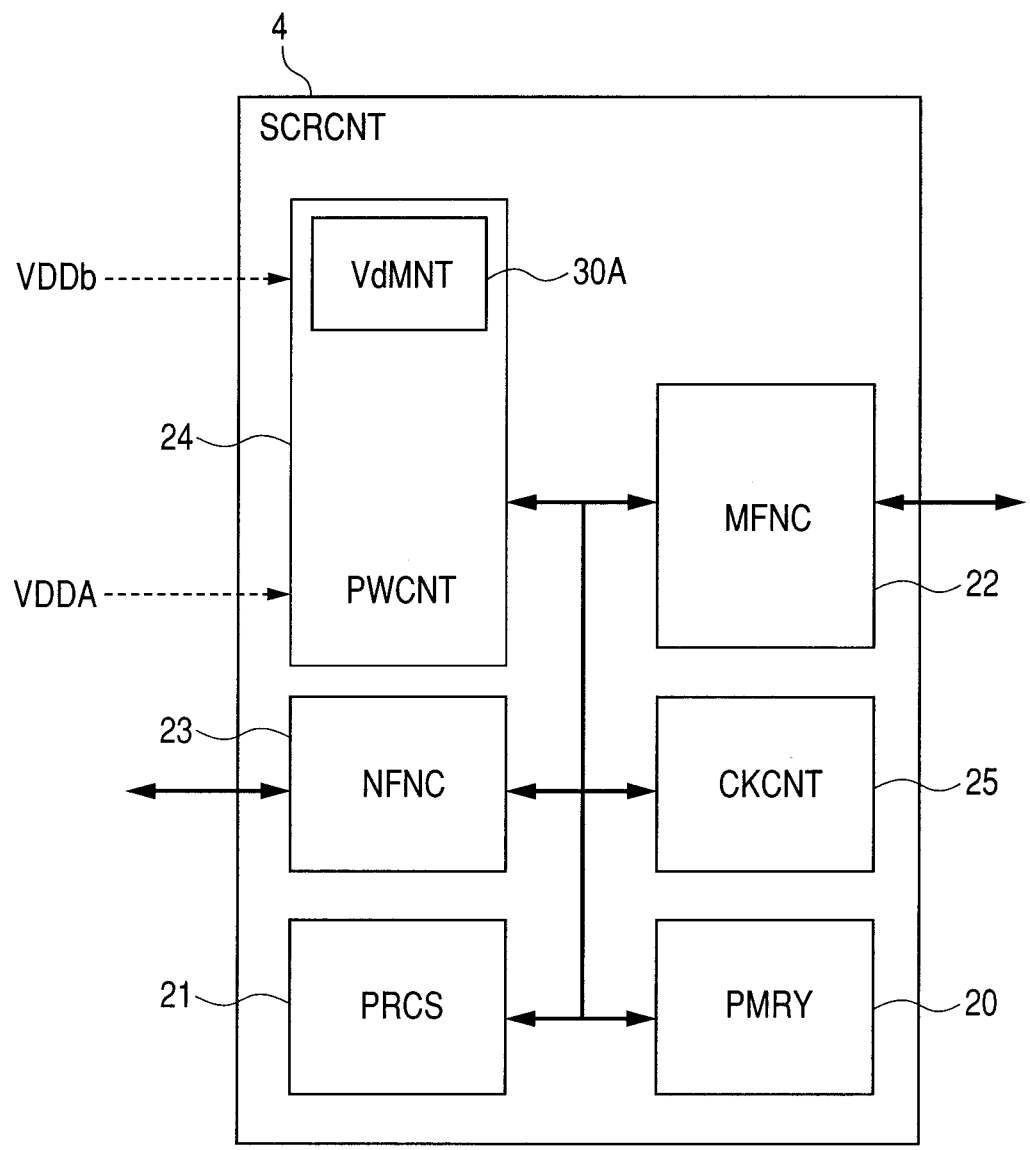
FIG. 17 is a block diagram illustrating an example of the configuration of the security controller in FIG. 16.
Figure 18:
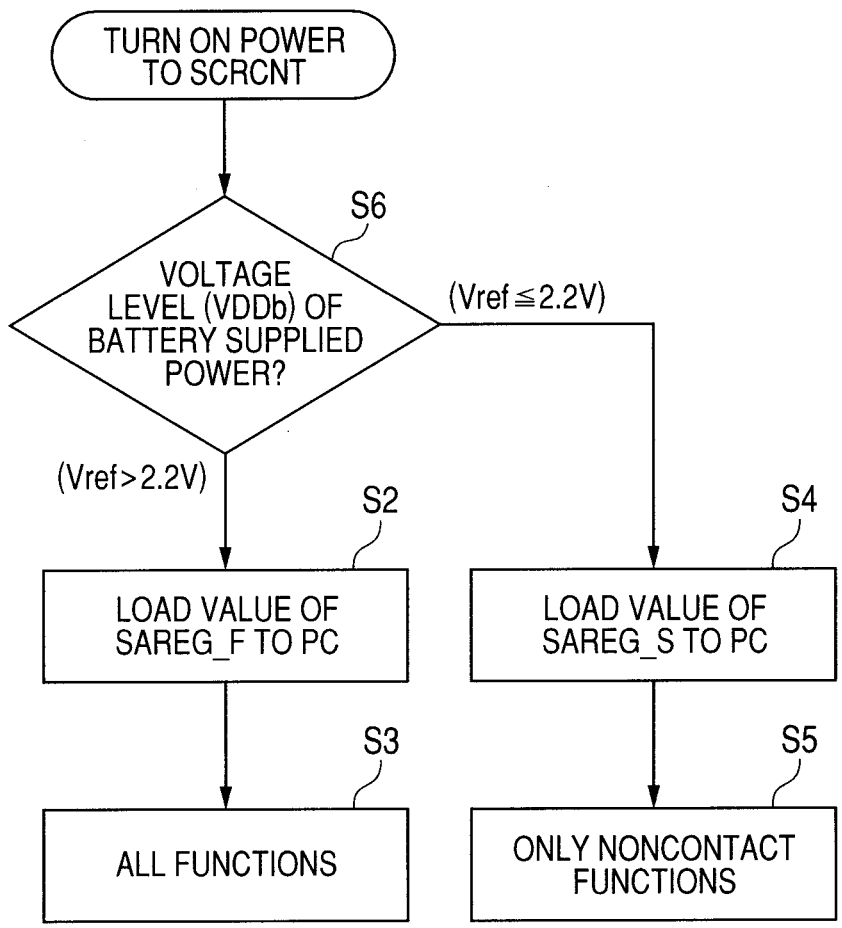

As illustrated in FIG. 16 as an example, battery voltage VDDb is directly supplied from the battery 5 to the security controller 4. At this time, as illustrated in FIG. 17 as an example, the security controller 4 determines whether or not the battery voltage VDDb has reached the specified voltage Vref by the voltage monitoring circuit 30A. The resulting determination signal ϕdt is used in, for example, the selection of a program start address described with reference to FIG. 11. In this case, the processing is carried out as illustrated in FIG. 18. That is, when the power to the security controller 4 is turned on, it is determined whether or not the battery voltage VDDb is higher than the specified voltage Vref (S6). When it is higher than, for example, the specified voltage Vref (=2.2V), the address of the first start address register (SAREG_F) 61 is loaded to the program counter (PC) of the processor 21 (S2). Then the execution of the first program is started at the loaded address and all the functions of the security controller 4 are made available (S3). Meanwhile, when the battery voltage is equal to or lower than, for example, the specified voltage Vref (=2.2V), the address of the second start address register (SAREG_S) 62 is loaded to the program counter (PC) of the processor 21 (S4). Then the execution of the second program started at the loaded address and in the security controller 4, only security processing for noncontact proximity communication is made available (S5). The mode for low power consumption control using the determination signal ϕdt may be any of the first mode to the third mode. In the example in FIG. 18, voltage level is determined only when power supply is turned on. Instead, it may be monitored as required or may be constantly monitored and the state of the security controller may be modified according thereto.

Figure 19:
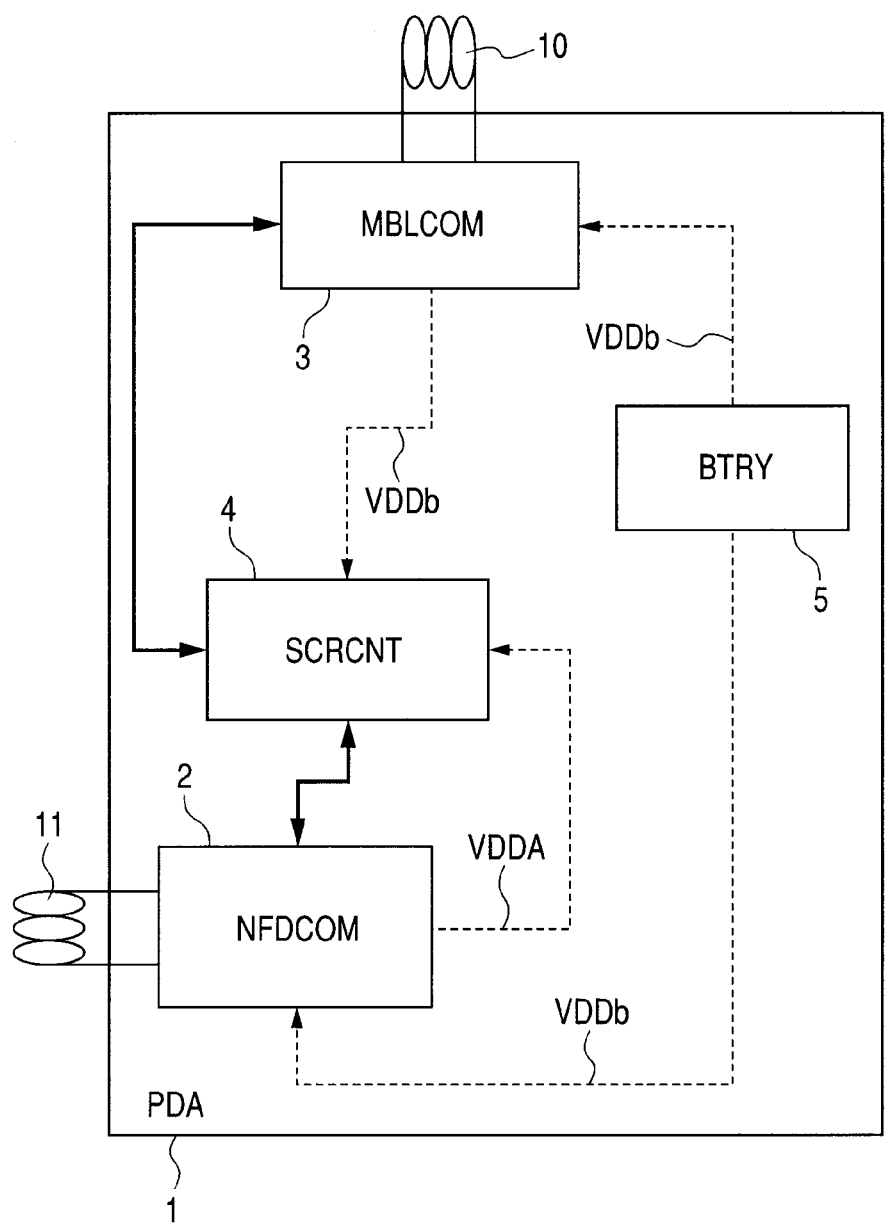
FIG. 19 is a block diagram of a mobile communication terminal device so configured that battery voltage VDDb is passed to a security controller 4 through a mobile communication unit unlike the configuration in FIG. 16.

Unlike the configuration in FIG. 16, the battery voltage VDDb may be passed from the mobile communication unit 3 to the security controller 4 as illustrated in FIG. 19.

<<Determination of Battery Voltage by Noncontact Proximity Communication Unit>>

In the above-described controls with low power consumption, the security controller 4 determines the operating voltage VDDA or the battery voltage. Description will be given to a sixth control mode with low power consumption in which the battery voltage VDDb is determined by the noncontact proximity communication unit 2.

Figure 20:
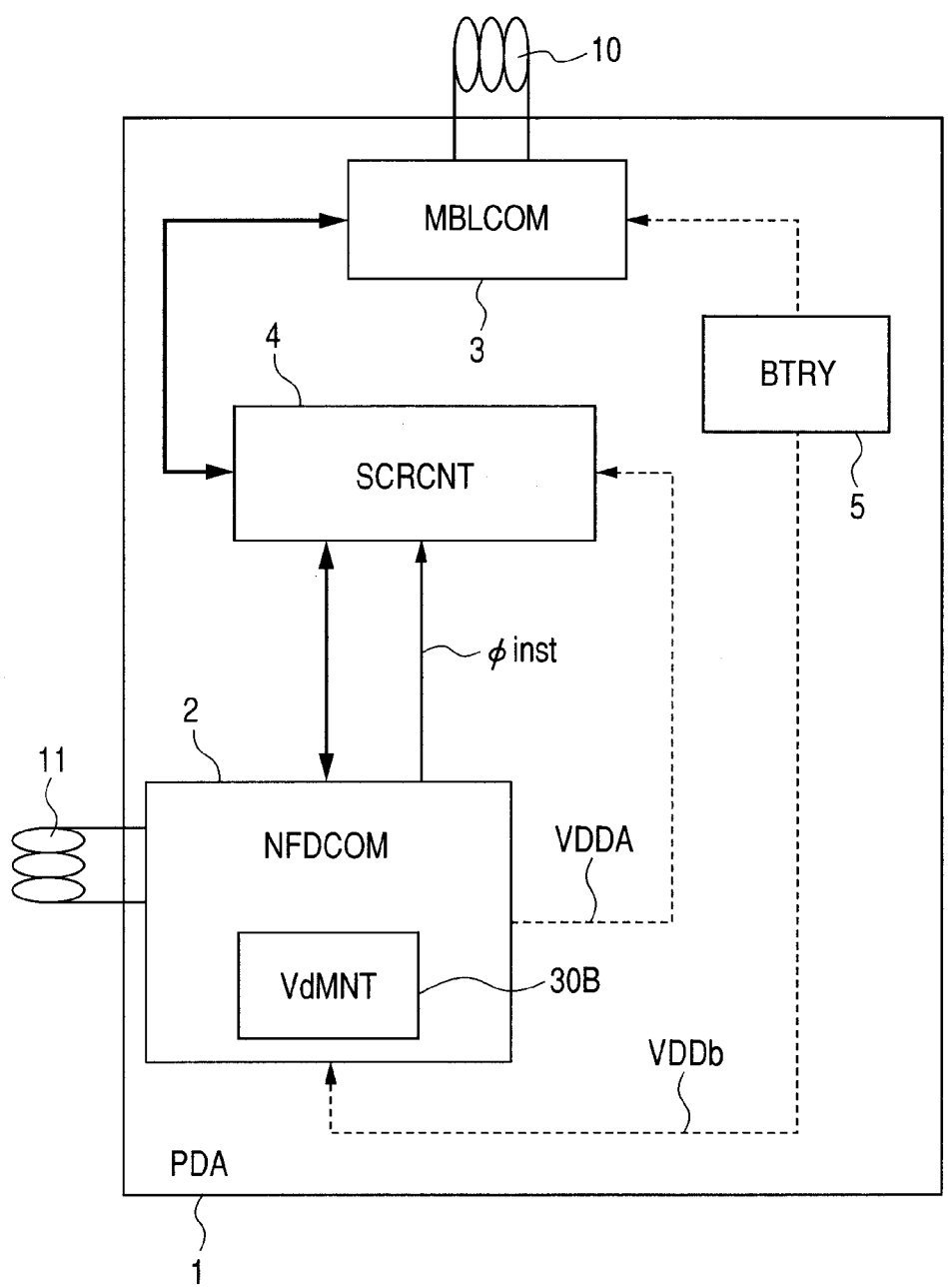
FIG. 20 is a block diagram of a mobile communication terminal device used in cases where a noncontact proximity communication unit determines battery voltage VDDb.
Figure 21:
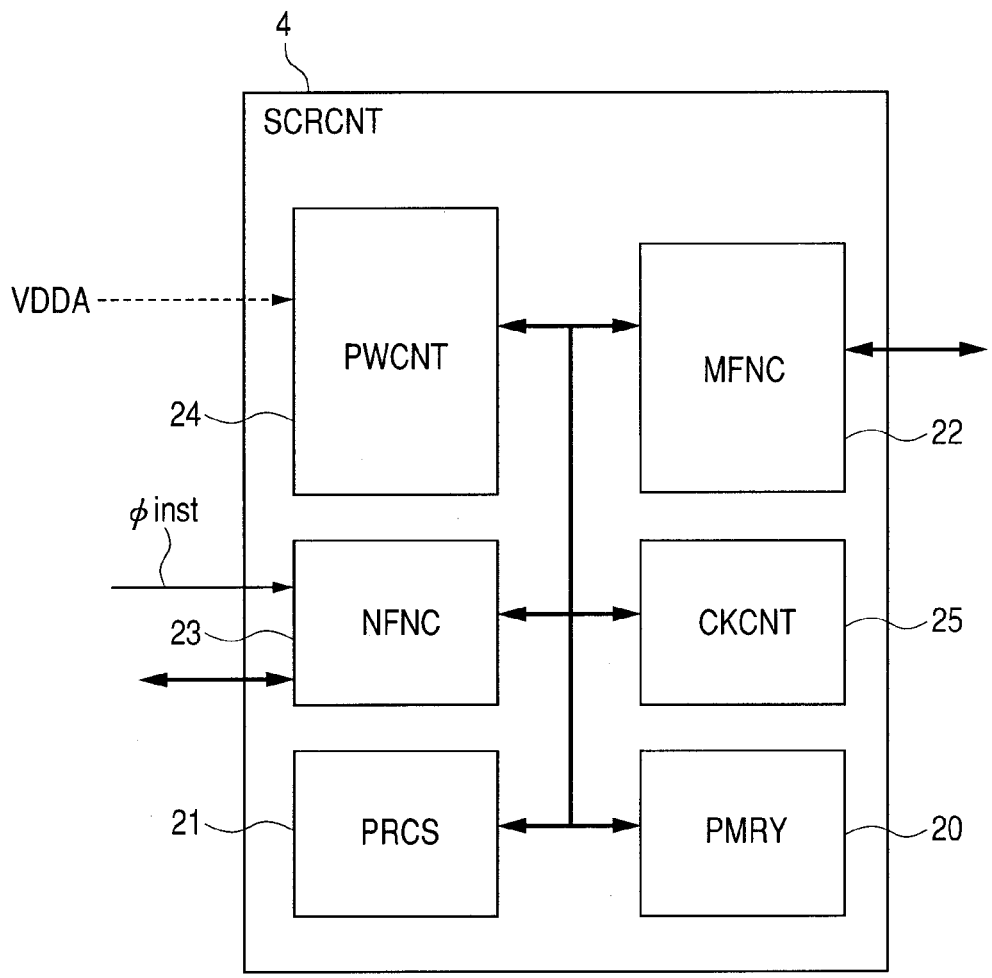
FIG. 21 is a block diagram of the security controller in FIG. 20.
Figure 22:
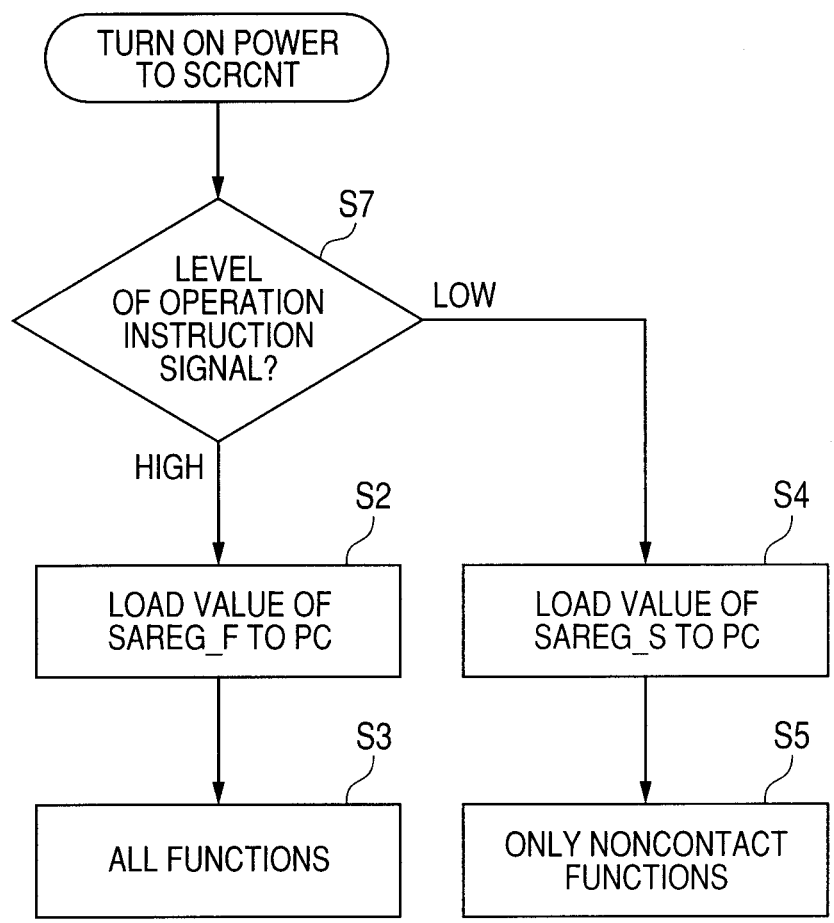

As illustrated in FIG. 20, the security controller 4 receives an instruction signal ϕinst and carries out the above-mentioned low power consumption control. This instruction signal corresponds to the result of determination of battery voltage VDDb by the voltage monitoring circuit 30B of the noncontact proximity communication unit 2. The voltage monitoring circuit 30B is implemented by the determination function of the operating voltage determination and selection circuit 13 described with reference to FIG. 2. That is, it uses the function for determining whether or not the battery voltage VDDb is higher than a predetermined voltage and passes the result of this determination to the control unit 17 in FIG. 2. The control unit 17 outputs an instruction signal ϕinst to the security controller 4. This example is based on the assumption that the predetermined voltage is equal to the specified voltage Vref. When the battery voltage VDDb is higher than the predetermined voltage, the instruction signal ϕinst is set to high level. When the battery voltage VDDb is equal to or lower than the predetermined voltage, the instruction signal ϕinst is set to low level. In the security controller 4, as illustrated in FIG. 21 as an example, the noncontact proximity communication interface circuit 23 receives the instruction signal ϕinst. The received instruction signal ϕinst is used in, for example, the selection of a program start address described with reference to FIG. 11. In this case, the processing is carried out as illustrated in FIG. 22. That is, when the power to the security controller 4 is turned on, the level of the instruction signal ϕinst is determined (S7). When the signal is at high level (that is, the battery voltage VDDb is higher than a predetermined voltage such as 2.2V), for example, the following processing is carried out: the address of the first start address register (SAREG_F) 61 is loaded to the program counter (PC) of the processor 21 (S2). Then the execution of the first program is started at the loaded address and all the functions of the security controller 4 are made available (S3). Meanwhile, when the level of the instruction signal ϕinst is low (that is, the battery voltage VDDb is equal to or lower than the predetermined voltage such as 2.2V), the following processing is carried out: the address of the second start address register (SAREG_S) 62 is loaded to the program counter (PC) of the processor 21 (S4). Then the execution of the second program is started at the loaded address and in the security controller 4, only security processing for noncontact proximity communication is made available (S5). The mode for low power consumption control using the instruction signal φdt may be any of the first mode to the third mode. In case of application to power supply/interruption control or the like, the instruction signal φinst only has to be supplied from the noncontact proximity communication interface circuit 23 to the power supply control circuit 24. In the example in FIG. 22, voltage level is determined only when power supply is turned on. Instead, it may be monitored as required or may be constantly monitored and the state of the security controller may be modified according thereto.

<<Determination of Battery Voltage by Both Mobile Communication Unit and Noncontact Proximity Communication Unit>>

Last, description will be given to a seventh control mode with low power consumption in which the battery voltage VDDb is determined by both the noncontact proximity communication unit 2 and the mobile communication unit 3.

Figure 23:
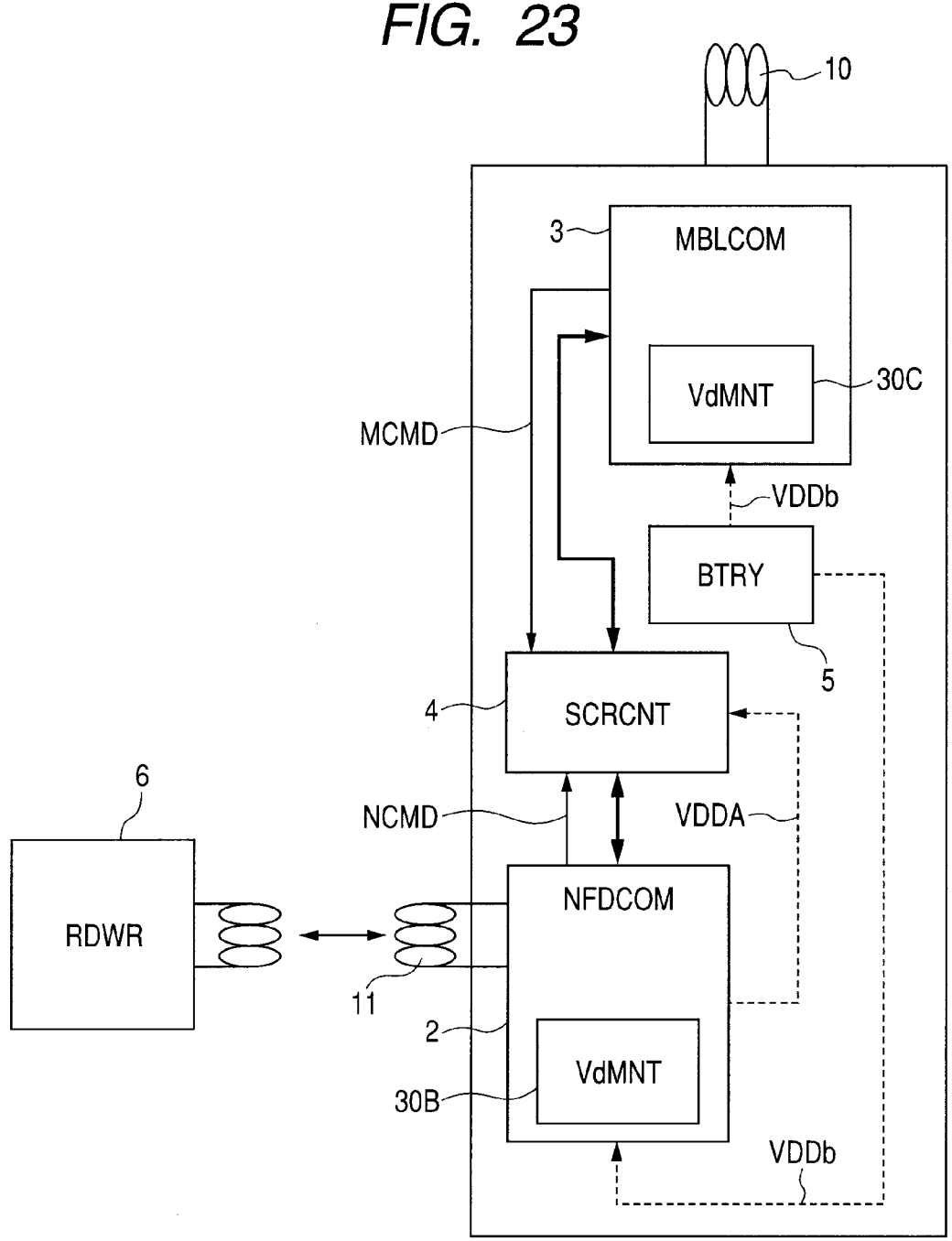
FIG. 23 is a block diagram of a mobile communication terminal device used when both a noncontact proximity communication unit and a mobile communication unit determine battery voltage VDDb.
Figure 24:
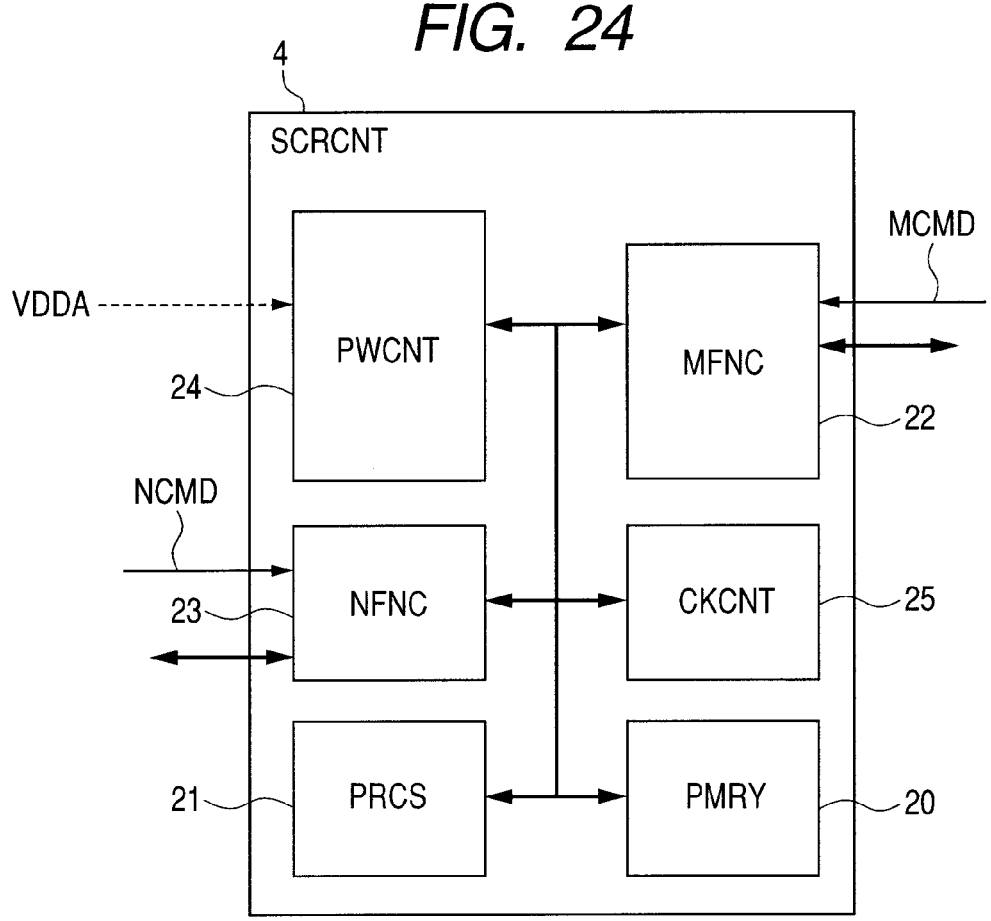
FIG. 24 is a block diagram of the security controller in FIG. 23.
Figure 25:
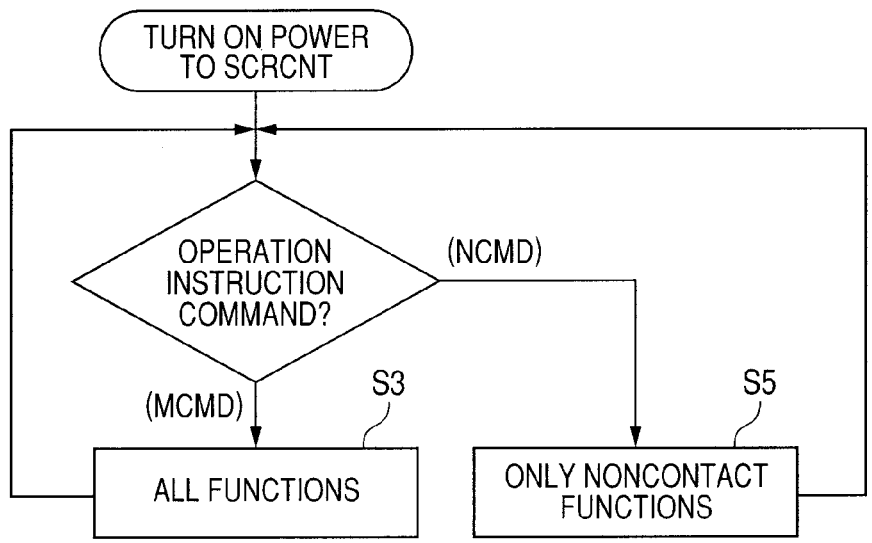
FIG. 25 is a flowchart illustrating low power consumption control of the security controller in FIG. 24.

As illustrated in FIG. 23 as an example, the noncontact proximity communication unit 2 includes the voltage monitoring circuit 30B and the mobile communication unit 3 includes a voltage monitoring circuit 30C. This is a circuit for determining the battery voltage VDDb, similar to the voltage monitoring circuit 30B. When it is determined by the voltage monitoring circuit 30B that the battery voltage VDDb has become equal to or lower than a specified voltage, the noncontact proximity communication unit 2 issues the command NCMD to the security controller 4. Meanwhile, when it is determined by the voltage monitoring circuit 30C that the battery voltage VDDb is higher than a specified voltage, the mobile communication unit 3 issues a command MCMD to the security controller 4. As illustrated FIG. 24, the command MCMD is received by the mobile communication unit interface circuit 22 and the command NCMD is received by the noncontact proximity communication unit interface circuit 23. When the security controller 4 receives the command MCMD, it instructs the following: starting the supply of power Vdd2 described with reference to FIG. 5; increasing the frequency of the clock signal CK described with reference to FIG. 7 and FIG. 8; starting the supply of the clock signal CK1 described with reference to FIG. 9; or the like. When the security controller 4 receives the command NCMD, meanwhile, it instructs the following: interrupting the supply of power Vdd2 described with reference to FIG. 5; reducing the frequency of the clock signal CK described with reference to FIG. 7 and FIG. 8; interrupting the supply of the clock signal CK1 described with reference to FIG. 9; or the like. As illustrated in FIG. 25, therefore, the following processing is carried out on a case-by-case basis as follows: when the command MCMD is issued to the security controller 4, all the functions of the security controller 4 are made available (S3); and when the command NCMD is issued to the security controller 4, only security processing for noncontact proximity communication is made available (S5). The processor responds to a command and low power consumption control is thereby carried out. Therefore, this processing largely depends on a difference from software to software (the operating program of the processor) and thus the control mode with low power consumption can be easily customized to the actual use environment.

Up to this point, concrete description has been given to the invention made by the present inventions with reference to embodiments. However, the invention is not limited to these embodiments and can be variously modified without departing from its subject matter, needless to add.

Some examples will be taken. The operating voltage determination and selection circuit 13 of the noncontact proximity communication unit may be so configured that the following is implemented: it outputs battery voltage VDDb as operating voltage VDDA until the battery voltage VDDb becomes equal to or lower than a predetermined voltage. Wireless communication longer in communication distance than noncontact proximity communication is not limited to mobile communication and may be wireless LAN communication or the like. Noncontact proximity communication need not be limited to that compliant with the following standards: a standard for noncontact IC cards internationally standardized in accordance with the ISO/IEC 14443 (proximity cards: communication distance of 10 cm or below) or an equivalent standard; or the ISO/IEC 15693 for the VICC type or an equivalent standard. It may be modified as appropriate. The invention is applicable not only to cellular phones but also to various types of mobile communication terminal devices.

What is claimed is:

1. A mobile communication terminal device comprising:
a noncontact proximity communication unit carrying out noncontact proximity communication;
a wireless communication unit carrying out wireless communication longer in communication distance than the noncontact proximity communication and input/output control for the wireless communication;
a security controller utilized in security processing for the noncontact proximity communication unit and the wireless communication unit; and
a battery,
wherein the noncontact proximity communication unit receives both electromagnetic field power from a carrier in noncontact proximity communication and battery power from the battery,
wherein the noncontact proximity communication unit supplies, as an operating supply power to the security controller, one of the electromagnetic field power and the battery power which is selected depending upon a voltage of the battery,
wherein the security controller determines whether or not voltage from power supplied from the noncontact proximity communication unit has reached a specified level and, when it is determined that the specified level has not been reached, carries out control so as to reduce the electricity consumption of the security controller,
wherein when the battery voltage is higher than a predetermined voltage, the noncontact proximity communication unit supplies the electromagnetic field power as the operating supply power to the security controller if the electromagnetic field power is produced, and supplies the battery power as the operating supply power to the security controller if the electromagnetic field power is not produced, and
wherein when battery voltage is lower than the predetermined voltage, the noncontact proximity communication unit supplies the electromagnetic field power as the operating supply power to the security controller if the electromagnetic field power is produced, and interrupts the supply of the battery power to the security controller.

2. The mobile communication terminal device according to claim 1,
wherein the security controller includes a clock control circuit generating a synchronous clock signal for internal operation, and
wherein when it is determined that the specified level has not been reached, the clock control circuit reduces the frequency of the synchronous clock signal as compared with when it is determined the specified level has been reached.

3. The mobile communication terminal device according to claim 1,
wherein the security controller includes a clock control circuit generating a synchronous clock signal for internal operation, and
wherein when it is determined that the specified level has not been reached, the clock control circuit interrupts the supply of a synchronous clock signal to a circuit utilized only in security processing for the wireless communication unit.

4. The mobile communication terminal device according to claim 1,
wherein when it is determined that the specified level has not been reached, the security controller interrupts the supply of operating power supply to a circuit utilized only in security processing for the wireless communication unit.

5. The mobile communication terminal device according to claim 1,
wherein the security controller includes:
a program memory unit;
a processor executing a program held by the program memory unit;
a first circuit used in security processing for the wireless communication unit; and
a second circuit used in security processing for the noncontact proximity communication unit, and
wherein the program memory holds:
a first initialization program for initializing a circuit used in security processing for the wireless communication unit;
a second initialization program for initializing a circuit used in security processing for the noncontact proximity communication unit;
a first security processing program used in security processing for the wireless communication unit; and
a second security processing program used in security processing for the noncontact proximity communication unit.

6. The mobile communication terminal device according to claim 5,
wherein the program memory unit includes:
a first program memory unit for storing the first initialization program and the first security processing program; and
a second program memory unit for storing the second initialization program and the second security processing program,
wherein a first operation mode in which operating power supply is supplied both to the first program memory unit and to the second program memory unit or a second operation mode in which operating power supply is supplied only to the second program memory unit is selectable, and
wherein the second operation mode is selected when the supply of operating power supply utilized only in security processing for the wireless communication unit is interrupted.

7. The mobile communication terminal device according to claim 6,
wherein the processor execute the first initialization program and the second initialization program to carry out initialization processing when it is determined at power-on reset that the voltage has reached a specified level, and executes the second initialization program to carry out initialization processing when it is determined that the voltage has not reached the specified level.

8. The mobile communication terminal device according to claim 1,
wherein the specified voltage and the predetermined voltage are equal to each other.

9. The mobile communication terminal device according to claim 1,
wherein the noncontact proximity communication unit includes a selection circuit that receives the electromagnetic field power and the battery power, and selects one of the electromagnetic field power and the battery power to be supplied as the operating supply power to the security controller.

10. A mobile communication terminal device comprising:
a battery;
a security controller; and
a noncontact proximity communication unit carrying out noncontact proximity communication,
wherein the noncontact proximity communication unit receives both electromagnetic field power from noncontact proximity communication and battery power from the battery,
wherein the noncontact proximity communication unit supplies, as an operating supply power to the security controller, one of the electromagnetic field power and the battery power which is selected depending upon a voltage of the battery,
wherein when the battery voltage is higher than a predetermined voltage, the noncontact proximity communication unit supplies the electromagnetic field power as the operating supply power to the security controller if the electromagnetic field power is produced, and supplies the battery power as the operating supply power to the security controller if the electromagnetic field power is not produced, and
wherein when battery voltage is lower than the predetermined voltage, the noncontact proximity communication unit supplies the electromagnetic field power as the operating supply power to the security controller if the electromagnetic field power is produced, and interrupts the supply of the battery power to the security controller.

11. The mobile communication terminal device according to claim 10, further comprising:
a wireless communication unit,
wherein the security controller provides a voltage based on the operating supply power to the wireless communication unit.

12. The mobile communication terminal device according to claim 10,
wherein the security controller includes a power controller that determines whether a voltage of the operating supply power reaches a certain voltage level,
wherein the power controller carries out control so as to reduce the electricity consumption of the security controller when the power controller determines that the certain voltage level is not reached.

13. The mobile communication terminal device according to claim 12,
wherein the power controller includes:
a voltage monitoring circuit monitoring the voltage of the operating supply power;
a first power supply unit supplying power to a noncontact proximity communication function unit; and
a second power supply unit supplying power to a mobile communication function unit, wherein the voltage monitoring circuit prevents the second power supply unit from supplying power to the mobile communication function unit when the certain voltage level is not reached.

14. The mobile communication terminal device according to claim 13,
wherein the voltage monitoring circuit includes:
a reference voltage generating circuit generating a voltage of the certain voltage level; and
a comparator outputting a comparison signal based on a comparison of the reference voltage and the voltage of the operating supply power.

15. A mobile communication terminal device comprising:
a battery;
a security controller; and
a noncontact proximity communication unit carrying out noncontact proximity communication,
wherein the noncontact proximity communication unit includes an operating voltage determination and selection circuit having a first terminal that receives a first voltage produced by noncontact proximity communication and a second terminal that receives a battery voltage,
wherein the operating voltage determination and selection circuit selects one of the first voltage and the battery voltage to be output as an operating supply voltage to the security controller, depending on the battery voltage,
wherein when the battery voltage is higher than a predetermined voltage, the operating voltage determination and selection circuit outputs the first voltage as the operating supply voltage to the security controller if the first voltage is produced, and outputs the battery voltage as the operating supply voltage to the security controller if the first voltage is not produced, and
wherein when battery voltage is lower than the predetermined voltage, the operating voltage determination and selection circuit outputs the first voltage as the operating supply voltage to the security controller if the first voltage is produced, and interrupts the supply of the battery voltage to the security controller.

16. The mobile communication terminal device according to claim 15, further comprising:
a wireless communication unit,
wherein the security controller is utilized in security processing for the noncontact proximity communication unit and the wireless communication unit, and
wherein the security controller provides a voltage based on the operating supply voltage to the wireless communication unit.

* * * * *